(12) United States Patent
Nishiura

(10) Patent No.: US 8,724,194 B2
(45) Date of Patent: May 13, 2014

(54) IMAGE PROCESSING APPARATUS EXECUTING COLOR CORRECTION ON IMAGE DATA

(75) Inventor: Mitsuko Nishiura, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 156 days.

(21) Appl. No.: 13/397,765

(22) Filed: Feb. 16, 2012

(65) Prior Publication Data
US 2012/0212786 A1 Aug. 23, 2012

(30) Foreign Application Priority Data

Feb. 17, 2011 (JP) .................................. 2011-031494
Oct. 7, 2011 (JP) .................................. 2011-222540

(51) Int. Cl.
*H04N 1/60* (2006.01)

(52) U.S. Cl.
USPC ............................ 358/518; 358/531; 358/537

(58) Field of Classification Search
USPC ......................................................... 358/531
See application file for complete search history.

(56) References Cited

U.S. PATENT DOCUMENTS

| | | | |
|---|---|---|---|
| 5,495,539 A | 2/1996 | Sieverding | |
| 5,604,610 A | 2/1997 | Spaulding et al. | |
| 5,987,165 A | 11/1999 | Matsuzaki et al. | |
| 6,701,011 B1 * | 3/2004 | Nakajima | 382/167 |
| 7,457,483 B2 * | 11/2008 | Tokiwa | 358/537 |
| 7,688,332 B2 * | 3/2010 | Yoshio et al. | 382/167 |
| 8,174,731 B2 * | 5/2012 | Hasegawa et al. | 358/504 |
| 2003/0202194 A1 | 10/2003 | Torigoe et al. | |
| 2004/0227964 A1 | 11/2004 | Fujino | |
| 2005/0174589 A1 | 8/2005 | Tokiwa | |
| 2007/0133024 A1 | 6/2007 | Kang et al. | |
| 2007/0250785 A1 | 10/2007 | Nakamura et al. | |

FOREIGN PATENT DOCUMENTS

| | | |
|---|---|---|
| EP | 1 677 236 A1 | 7/2006 |
| EP | 1 885 116 A1 | 2/2008 |
| JP | 6-311353 A | 11/1994 |
| JP | 2001-218075 A | 8/2001 |
| JP | 2003-324617 A | 11/2003 |
| JP | 2004-227402 A | 8/2004 |
| WO | 2008/111476 A1 | 9/2008 |
| WO | 2010/062284 A1 | 6/2010 |

OTHER PUBLICATIONS

Partial European Search Report issued to European Application No. 12155623.7, mailed Apr. 11, 2012.
European Search Report issued to European Application No. 12155623.7, mailed Jul. 25, 2012.
EESR issued to EP Application No. 13156413.0, mailed Mar. 19, 2013.

* cited by examiner

*Primary Examiner* — Scott A Rogers
(74) *Attorney, Agent, or Firm* — Knobbe Martens Olson & Bear LLP

(57) ABSTRACT

An image processing apparatus includes a pixel extracting unit, a correction quantity calculating unit, a selection image storage unit, a selection receiving unit, and a color correction executing unit. The pixel extracting unit extracts a pixel from predetermined image data. The correction quantity calculating unit calculates a color correction quantity based on a color difference between a color of the pixel extracted by the pixel extracting unit and a target color. The selection image storage unit stores data of a selection image representing an external appearance of each image data obtained by executing color correction on the pixel according to the color correction quantity. The selection receiving unit receives selection of a color correction type. The color correction executing unit executes color correction on the extracted pixel in image data of a correction object according to a color correction quantity corresponding to the color correction type.

9 Claims, 19 Drawing Sheets

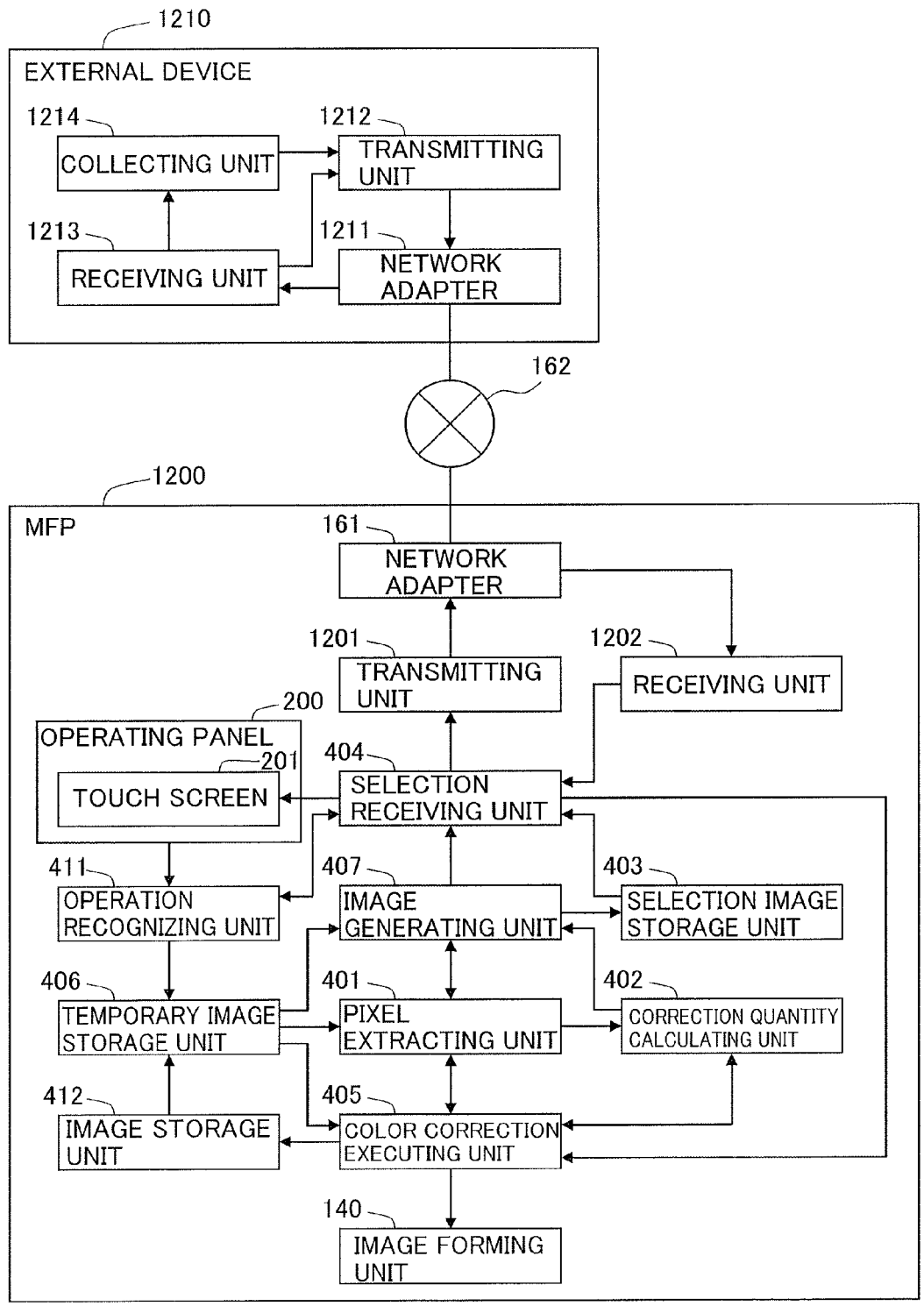

| TARGET COLOR IDENTIFIER | NUMBER OF SELECTION TIMES OF REGIONS | | | | | |
|---|---|---|---|---|---|---|
| | AS01 | AS02 | NA01 | SA02 | EP01 | EP02 |
| BLUE 1 | 188 | 154 | 32 | 65 | 54 | 48 |
| BLUE 2 | 24 | 20 | 102 | 132 | 92 | 80 |
| BLUE 3 | 84 | 95 | 54 | 80 | 135 | 124 |

| TARGET COLOR IDENTIFIER | NUMBER OF SELECTION TIMES OF REGIONS | | | | | |
|---|---|---|---|---|---|---|
| | AS01 | AS02 | NA01 | SA02 | EP01 | EP02 |
| BLUE 1 | 188 | 154 | 32 | 65 | 54 | 48 |
| BLUE 2 | 24 | 20 | 102 | 132 | 92 | 80 |
| BLUE 3 | 84 | 95 | 54 | 80 | 135 | 124 |
| BLUE 4 | 2 | 1 | 3 | 1 | 10 | 8 |
| BLUE 5 | 4 | 0 | 2 | 1 | 5 | 12 |

IMAGE PROCESSING APPARATUS EXECUTING COLOR CORRECTION ON IMAGE DATA

This application is based on and claims the benefit of priority from Japanese Patent Application Nos. 2011-031494 and 2011-222540, respectively filed on 17 Feb. 2011 and 7 Oct. 2011, the contents of which are incorporated herein by reference.

BACKGROUND

The present disclosure relates to an image processing apparatus that executes color correction on image data.

In recent years, image forming apparatuses (image processing apparatuses) with a color printing function, such as copying machines or multi-function peripherals (MFPs), have been commonly used. For example, image forming apparatuses with a color printing function implement color printing by combining printings by recording agents such as toner or ink of four colors of cyan (C), magenta (M), yellow (Y), and black (K).

Conventionally, image forming apparatuses are required to reliably reproduce a color of an original image.

In recently years, as an image including a photograph or the like can be printed, a function of converting a color of an image to print into a color preferred by human also started to be required.

For this reason, many of image forming apparatuses with a color printing function have a function of performing color correction on image data (for example, a related art 1).

Here, converting a color into a color preferred by human specifically means reproducing a so-called memory color. For example, the memory color refers a color such as a skin of human, the blue of the sky, the green of vegetation, and the red of sunset. The memory color is not a color faithfully reproduced from an original image, but a color, close to a color remembered by human, which human desires it to be reproduced.

In color correction for reproducing the memory color, correction of emphasizing a specific color, brightness correction, and the like may be executed at the same time. For example, when the blue of the sky which is pale blue close to a aqua blue is approximated to the memory color (deep blue), a user first changes a distribution state of blue within a range of a color gamut (an area where color reproduction is made) of blue, and executes color correction of emphasizing blue. Next, when the entire image looks dark as a result of emphasizing blue to be approximated to the memory color, the user further performs correction of brightening the entire image. However, in such image correction, color balance of a hue or the like may change by correction of brightness, and a color adjusted by blue emphasis correction may be deviated from a preferred color.

The related art 1 discloses a technique in which, among image correction parameters for color correction, brightness correction, sharpness correction, contrast correction, and the like, corrected images in which two different kinds of parameters are mutually changed and non-corrected images are displayed in the form of a matrix, and the user can select a desired image. According to the related art 1, a desired image is selected from among a plurality of images corrected by mutually changing a plurality of parameters. Since a correction parameter to apply can be decided, a desired image can be relatively easily acquired.

Meanwhile, it is known that there is a regional difference in a color preferred by human. In order to cope with such a regional difference, a technique of implementing color correction according to an installation region has been employed in image forming apparatuses which are sold in foreign countries as well as Japan (related arts 2 and 3).

For example, the related art 2 discloses an image processing apparatus that includes a plurality of output color tables classified according to an installation region of an apparatus and a user's race, and changes an output color table to use according to the user's request. Further, the related art 3 discloses an image processing apparatus that includes output profiles respectively corresponding to a plurality of regions, and uses an output profile obtained by synthesizing the output profiles at a synthesis ratio instructed by the user.

Meanwhile, when color correction is executed on some areas in image data, a pseudo contour may be generated in the boundary between the areas, or a tone becomes unnatural. As a countermeasure against this phenomenon, the related art 4 discloses an image forming apparatus in which a color correction coefficient differs according to a memory color. In this technique, when a memory color on which the user desires to put the most emphasis at the time of color reproduction is selected from among memory colors included in an original image, color correction is executed using a color correction coefficient corresponding to the selected memory color.

However, the above-described color correction of changing the distribution state of the specific color (blue in the above example) within the range of the color gamut is executed on all of pixels configuring image data. For this reason, the correction is reflected in the entire image. In the above example, since blue is emphasized on all pixels configuring image data, pixels including a blue component become more bluish. That is, the correction process corrects even a color of a portion to which color correction is not desired to be applied.

For example, when the above color correction is executed in an image forming apparatus with a function of designating an area, on which image correction is executed, in image data of a correction object, the drawback of the above correction process may be solved by employing a configuration of allowing the user to designate an area on which color correction is to be executed. However, when this configuration is employed, the work by the user is extremely complicated. Further, when a complicated process is necessary for designating an area, one user occupies the image forming apparatus for a long time. Thus, when the image forming apparatus is shared in an office or the like, work efficiency of all users who share the image forming apparatus is lowered.

Further, when the technique disclosed in the related art 4 is employed, color correction is executed using a dedicated color correction coefficient associated with the selected memory color. For this reason, color correction needs to be independently executed, and thus, for example, it is difficult to execute another color correction on the entire image data at the same time.

Meanwhile, when the techniques disclosed in the related arts 2 and 3 are employed, a memory color corresponding to a regional difference can be reflected in color correction. However, since the technique disclosed in the related art 2 is configured to change only the output color table according to the region, it is difficult to confirm whether or not the selected output color table matches with its own image until a printed material is output. In addition, the user's request may not be satisfied by the output color table arranged in the image processing apparatus. Furthermore, the technique disclosed in the related art 3 is configured to synthesize the output profiles arranged in the image processing apparatus at an arbitrary ratio. Thus, the number of selectable output profiles increases compared to the technique disclosed in the related art 2. However, since it is configured to change the synthesis ratio of the output profiles for a specific region previously arranged in the image processing apparatus, it is difficult to cover a regional difference in the user's favorite color.

SUMMARY

An image processing apparatus according to an aspect of the present disclosure includes a display unit, an image storage unit, a pixel extracting unit, a correction quantity calculating unit, a selection image storage unit, a selection receiving unit, and a color correction executing unit.

The display unit displays an image.

The image storage unit stores at least one image data.

The pixel extracting unit extracts a pixel belonging to a predetermined color range from predetermined image data stored in the image storage unit.

The correction quantity calculating unit calculates a color correction quantity on the pixel based on a color difference between a color of the pixel belonging to the predetermined color range extracted by the pixel extracting unit and each of at least one target color associated with the color range.

The selection image storage unit stores data of a selection image representing an external appearance of each image data obtained by executing color correction on the pixel belonging to the color range according to the color correction quantity which is calculated by the correction quantity calculating unit and corresponds to each of the at least one target color.

The selection receiving unit causes the selection image to be displayed on the display unit based on data of the selection image stored in the selection image storage unit and receives selection of a color correction type corresponding to the target color.

The color correction executing unit executes color correction on the extracted pixel belonging to the predetermined color range in image data of a correction object according to a color correction quantity corresponding to the color correction type received by the selection receiving unit.

BRIEF DESCRIPTION OF THE DRAWINGS

FIG. 12 is a functional block diagram of an MFP according to a second embodiment of the present disclosure.

FIG. 13A is a diagram illustrating an example of a collection table stored in the MFP according to the second embodiment of the present disclosure.

FIG. 13B is a diagram illustrating an example of a collection table stored in the MFP according to the second embodiment of the present disclosure.

DETAILED DESCRIPTION

Hereinafter, exemplary embodiments of the present disclosure will be described in further detail with the accompanying drawings. In the following, the present disclosure will be embodied as a digital MFP.

First Embodiment

Figure 1:
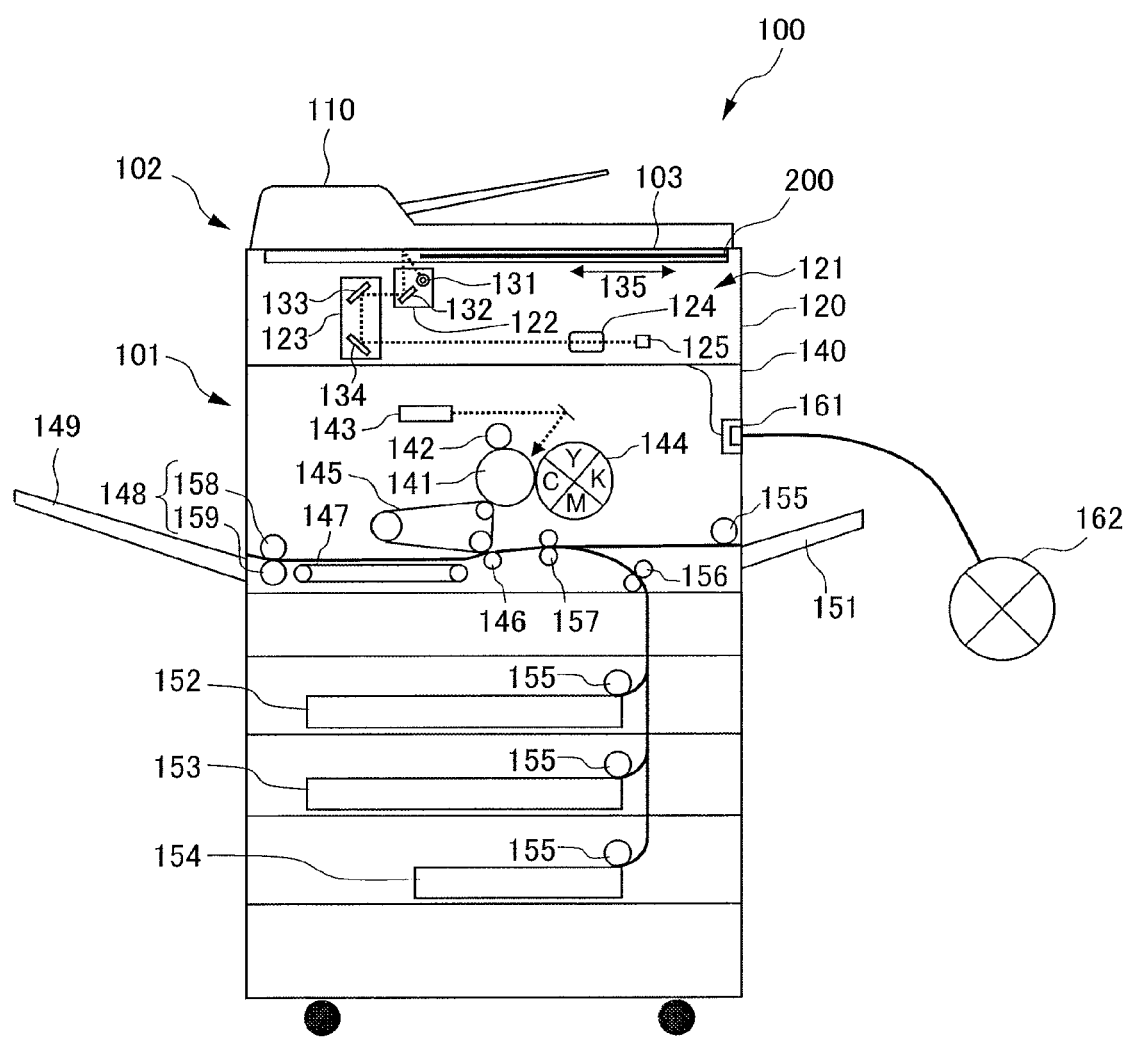
FIG. 1 is a schematic configuration diagram illustrating an entire configuration of an MFP according to a first embodiment of the present disclosure.

FIG. 1 is a schematic configuration diagram illustrating an example of an entire configuration of a digital MFP according to the present embodiment. As illustrated in FIG. 1, an MFP 100 includes a main body 101 configured with an image scanning unit 120 and an image forming unit 140, and a platen cover 102 mounted above the main body 101. A document table 103 is provided on the upper surface of the main body 101, and the document table 103 is configured to be opened or closed by the platen cover 102. The platen cover 102 includes a document feeder 110.

The image scanning unit 120 is provided below the document table 103. The image scanning unit 120 scans an image of an original document through an optical scanning system 121 and generates digital data (image data) of the image. An original document is placed on the document table 103 or the document feeder 110. The optical scanning system 121 includes a first carriage 122, a second carriage 123, and a collecting lens 124. The first carriage 122 includes a linear light source 131 and a mirror 132, and the second carriage 123 includes mirrors 133 and 134. The light source 131 illuminates an original document. The mirrors 132, 133, and 134 guide reflected light from the original document to the collecting lens 124. The collecting lens 124 forms a light image on a light receiving surface of a line image sensor 125. In the optical scanning system 121, the first carriage 122 and the second carriage 123 are provided to reciprocate in a sub scanning direction 135. By moving the first carriage 122 and the second carriage 123 in the sub scanning direction 135, the image scanning unit 120 can scan the image of the original document placed on the document table 103 through the image sensor 125. When the image of the original document set on the document feeder 110 is scanned, the image scanning unit 120 temporarily fixes the first carriage 122 and the second carriage 123 according to an image scanning position, and scans the image of the original document passing through the image scanning position through the image sensor 125. For example, the image sensor 125 generates image data of the original document corresponding to colors of red (R), green (G), and blue (B) from the light image incident to the light receiving surface. The image forming unit 140 can print the scanned image on a sheet based on the generated image data. The MFP 100 can transmit image data to another device via a network 162 through a network adapter 161.

The image forming unit 140 prints an image on a sheet based on image data obtained by the image scanning unit 120 and image data received from another device (not shown) connected to the network 162. The image forming unit 140 includes a photosensitive drum 141. The photosensitive drum 141 rotates in one direction at constant velocity. A charging unit 142, an exposing unit 143, a developing unit 144, and an intermediate transfer belt 145 are arranged around the photosensitive drum 141 in order from an upstream side in a rotation direction. The charging unit 142 uniformly charges the surface of the photosensitive drum 141. The exposing unit 143 irradiates the uniformly charged surface of the photosensitive drum 141 with light according to image data and forms an electrostatic latent image on the photosensitive drum 141. The developing unit 144 transfers toner to the electrostatic latent image and forms a toner image on the photosensitive drum 141. The intermediate transfer belt 145 transfers the toner image on the photosensitive drum 141 onto the sheet. When image data represents a color image, the intermediate transfer belt 145 transfers toner images of respective colors onto the same sheet. A color image of an RGB format is converted into image data of a CMYK format (cyan (C), magenta (M), yellow (Y), and black (K)), and image data of the respective colors is input to the exposing unit 143.

The image forming unit 140 feeds the sheet to a transfer unit between the intermediate transfer belt 145 and the transfer roller 146 from a bypass tray 151, paper cassettes 152, 153, and 154, or the like. Sheets with various sizes can be stacked or received on the bypass tray 151 or each of the paper cassettes 152, 153, and 154. The image forming unit 140 selects a sheet designated by a user or a sheet according to an automatically detected size of an original document, and feeds the selected sheet from the bypass tray 151 or the paper cassettes 152, 153, and 154 through the feeding roller 155. The fed sheet is conveyed to the transfer unit by a carriage roller 156 and a registration roller 157. The sheet onto which the toner image is transferred is conveyed to a fixing unit 148 by a conveying belt 147. The fixing unit 148 includes a fixing roller 158 having a heater built therein and a pressing roller 159, and fixes the toner image onto the sheet by heat and pressing force. The image forming unit 140 discharges the sheet having passed through the fixing unit 148 to a discharge tray 149.

Figure 2:
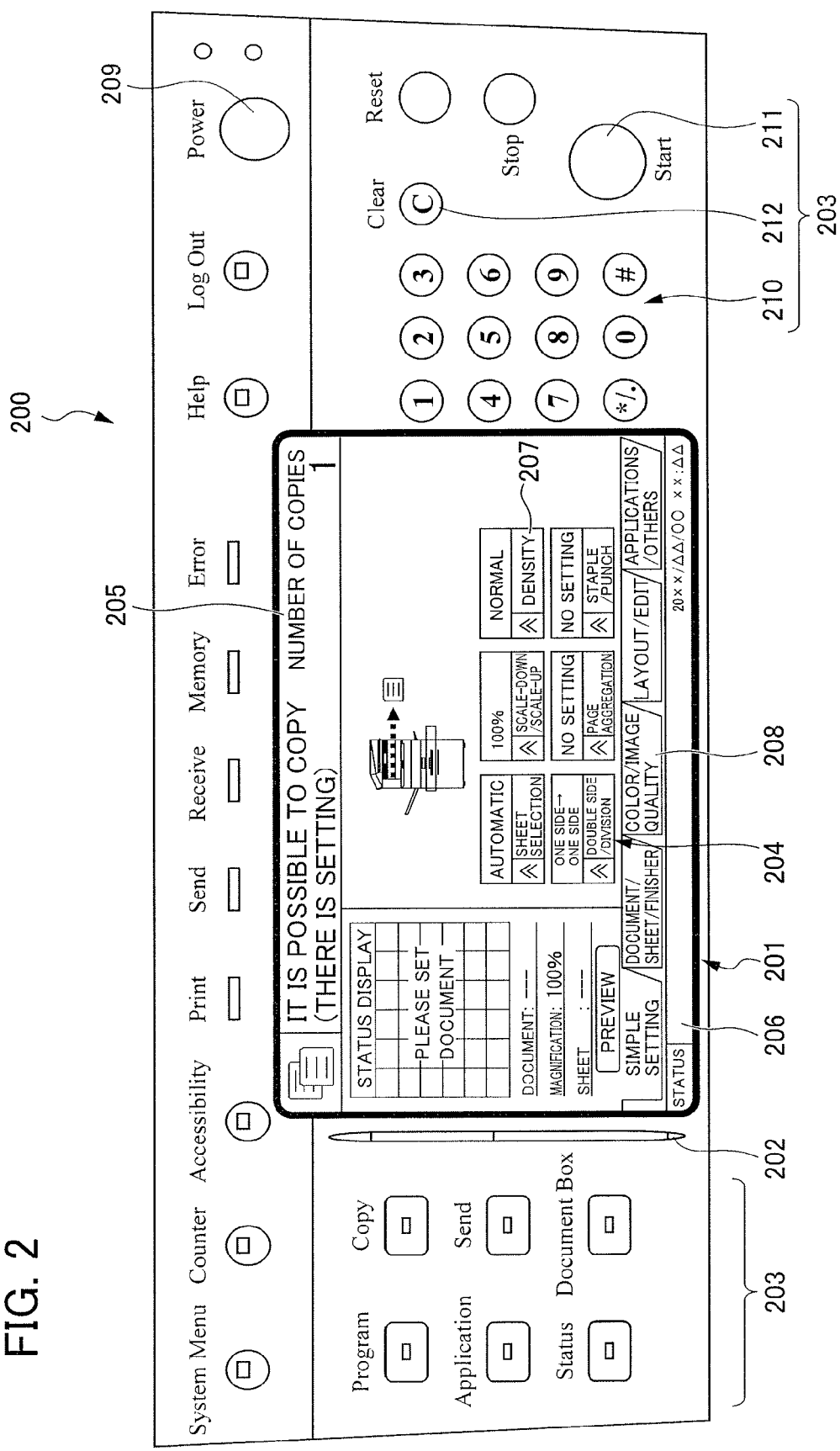
FIG. 2 is a schematic diagram illustrating an operating panel of the MFP according to the first embodiment of the present disclosure.

FIG. 2 is a diagram illustrating an example of an external appearance of an operating panel included in an MFP. The user can give an instruction for starting a copying operation and other instructions to the MFP 100, and check a status and setting of the MFP 100 using the operating panel 200. The operating panel 200 includes a touch screen (a display with a touch panel) 201 and an operating key 203. The touch screen 201 includes a display unit, configured with a liquid crystal display (LCD) or the like, which displays an operating button, a message, and the like and a sensor that detects a pressing position on the display unit. A method of detecting the pressing position is not particularly limited. An arbitrary type such as a resistive type, a capacitive type, a surface acoustic wave (SAW) type, and an electromagnetic type may be employed. The user can perform an input operation on the touch screen 201 using his/her finger or a touch pen 202.

The touch screen 201 displays an operation screen including a button display portion 204, a message display portion 205, and a status display portion 206. A plurality of tabs 208 is arranged on the button display portion 204. Operating buttons corresponding to a category of the tab are arranged on a screen corresponding to each tab. A "simple setting" tab includes operating buttons used for basic setting. In the example of FIG. 2, operating buttons for setting a sheet size, copying magnification, density, a print side, page aggregation, and post processing are arranged on the screen corresponding to the "simple setting" tab. For example, when the user performs an operation of pressing a "density" button 207, a pop-up screen including a selecting button for selecting the density such as "thin", "normal", and "thick" is displayed on the operating button thereof in a superimposed manner. The density is set by the user's selection (pressing). In the example of FIG. 2, an "document/sheet/finisher" tab, a "color/image quality" tab, a "layout/edit" tab, and a "applications/others" tab as well as the "simple setting" tab are displayed on the operation screen. The user can cause the tabs to be displayed by performing an operation of selecting the tab button 208. In a state in which one tab is selected, the other tabs or elements thereof are hidden (not displayed) on the operation screen. In the MFP 100, color correction, which will be described later, may be executed by pressing a "one touch image quality adjusting" button included in the "color/image quality" tab.

A message for notifying the user of setting, such as whether or not a copying operation can be performed and the number of sheets to copy, is displayed on the message display portion 205. Apparatus status information is displayed on the status display portion 206 as necessary. Detection results of various sensors included in the MFP 100 are reflected in this display. The apparatus status information refers to a message for notifying the user of an alert for prompting a response to abnormality even though an apparatus is in an operable state. Examples of the apparatus status information include information representing that the number of remaining sheets is small, information representing that the document table 103 is contaminated, and information representing that a facsimile document is stored in a memory when a facsimile memory reception function is set. The apparatus status information may further include paper-out information, conveying jam information, and the like.

The operating key 203 includes a main power key 209, a ten key 210, a start key 211, a clear key 212, and the like. For example, the power key 209 is used to turn the MFP 100 on or off. The ten key 210 may be used for designating the number of sheets to copy or for setting the copying magnification. When the user designates the number of sheets to copy or sets the copying magnification using the ten key 210 or the like, the MFP 100 displays a message like "copying is possible (there is setting)" on the message display portion 205 and thus notifies that setting has been made by the user. The start key 211 is used to give an instruction for starting a copying operation or an image printing operation. The user operates the clear key 212 to release setting made by himself/herself. Since it can be determined based on the above described message whether or not a machine has accepted setting made by the user, when the setting becomes unnecessary, it is desirable to operate the clear key 212.

Figure 3:
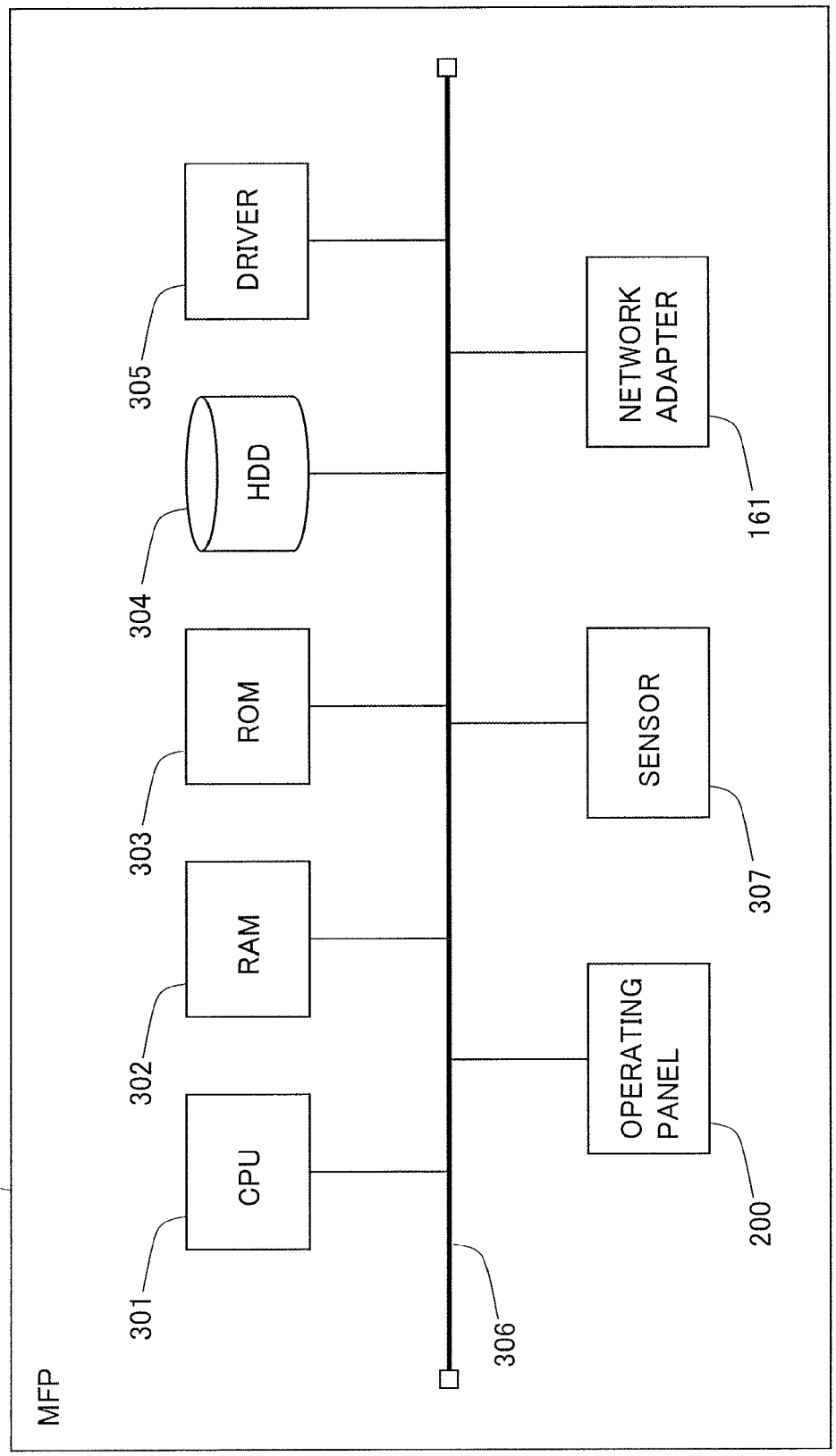
FIG. 3 is a diagram illustrating a hardware configuration of the MFP according to the first embodiment of the present disclosure.

FIG. 3 is a hardware configuration view of a control system in an MFP. The MFP 100 of the present embodiment includes a central processing unit (CPU) 301, a random access memory (RAM) 302, a read only memory (ROM) 303, a hard disk drive (HDD) 304, and a driver 305 that supports driving units in the document feeder 110, the image scanning unit 120, and the image forming unit 140. The CPU 301, the RAM 302, the ROM 303, the HDD 304, and the driver 305 are connected to one another via an internal bus 306. The ROM 303, the HDD 304, or the like store a program. The CPU 301 controls the MFP 100 according to a command of a control program thereof. For example, the CPU 301 uses the RAM 302 as a working area, receives data or a command from the driver 305, and controls an operation of each driving unit. The HDD 304 is also used to accumulate image data obtained from the image scanning unit 120 and image data received from another apparatus via the network adapter 161.

The operating panel 200 and various sensors 307 are also connected to the internal bus 306. The operating panel 200 receives the user's operation and supplies the CPU 301 with a signal based on the operation. The touch screen 201 displays the operation screen according to a control signal from the CPU 301. The sensors 307 include various sensors such as a sensor for detecting an open or close state of the platen cover 102, a sensor of detecting an original document set on the document table 103, a sensor of detecting the temperature of the fixing unit 148, and a sensor of detecting a conveyed sheet or original document. For example, by executing a program stored in the ROM 303, the CPU 301 implements the following units (functional units) and controls operations of the units according to signals from the sensors.

Figure 4:
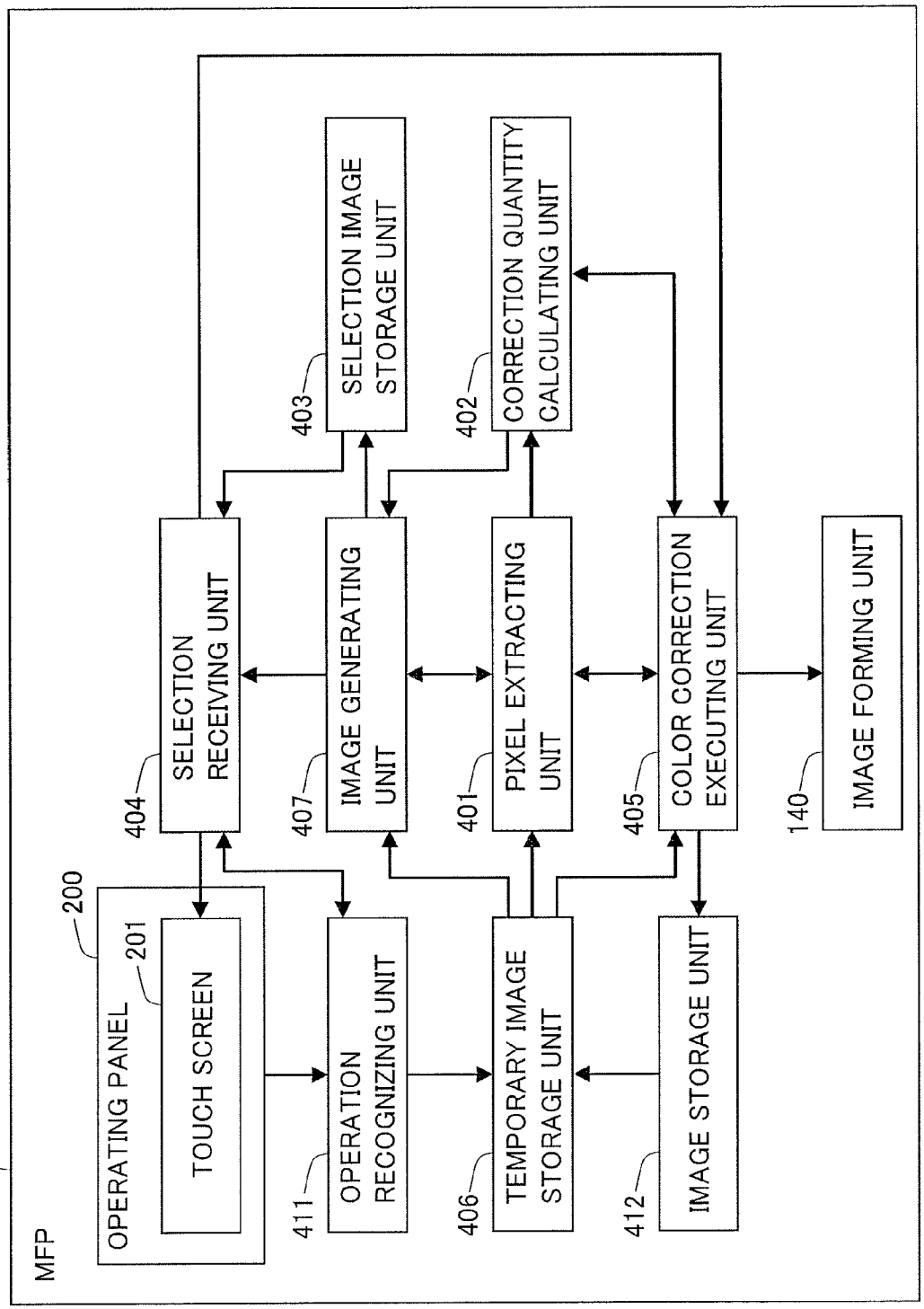
FIG. 4 is a functional block diagram of the MFP according to the first embodiment of the present disclosure.

FIG. 4 is a functional block diagram of an MFP of the present embodiment. As illustrated in FIG. 4, the MFP 100 of the present embodiment includes a pixel extracting unit 401, a correction quantity calculating unit 402, a selection image storage unit 403, a selection receiving unit 404, a color correction executing unit 405, a temporary image storage unit 406, and an image generating unit 407.

The temporary image storage unit 406 temporarily stores image data of a color correction object. For example, the image data stored in the temporary image storage unit 406 is acquired from an image storage unit 412. The image storage unit 412 is a storage area secured in the HDD 304 and stores image data input from the image scanning unit 120 or image data input from an external device via the network 162 or the like. The image data input from the image scanning unit 120, the image data input from an external device via the network 162 and the like may be directly stored in the temporary image storage unit 406.

The pixel extracting unit 401 extracts a pixel belonging to a previously designated color range from a thumbnail image (which will be described later) representing an external appearance of image data stored in the temporary image storage unit 406 or non-corrected image data generated by the image generating unit 407. For example, the color range refers to a uniform color space and can be set as a color occupying a certain area in the CIE L*C*h color space. Here, the image data includes color information expressed by a color component configuring an absolute color space such as standard RGB (sRGB), and can be easily transformed into an expression in the CIE L*C*h color space. When the image data includes color information expressed by a device-dependent RGB format, the MFP 100 transforms the color information into color information expressed by the absolute color space.

The correction quantity calculating unit 402 calculates a color correction quantity on the pixel extracted by the pixel extracting unit 401 based on a color difference between a color of the pixel and a target color associated with the color range. If all pixels extracted by the pixel extracting unit 401 are transformed into one target color which is designated in advance, a tone jump occurs, and thus the image quality remarkably deteriorates. For this reason, the correction quantity calculating unit 402 prevents the occurrence of the tone jump by calculating the color correction quantity corresponding to the color difference between the color of the pixel extracted by the pixel extracting unit 401 and the target color associated with the color range, that is, the color correction quantity corresponding to a distance between the two colors in the uniform color space (or the uniform color plane). In the correction technique, correction of approximating the color of the pixel extracted by the pixel extracting unit 401 to the target color can be implemented.

Specifically, when the color difference is large, a correction quantity in a direction toward the target color (hereinafter, referred to as "color correction vector") is increased, whereas when the color difference is small, the color correction vector is decreased. Even though not particularly limited, in the present embodiment, one correction parameter is selected, for example, from among correction parameters a1, a2, a3, a4, and a5 of five steps (a1<a2<a3<a4<a5), according to the magnitude of the color difference, and the size of the color correction vector is calculated by a product of the color difference and the selected correction parameter. In this case, the correction parameter is set as a value between 0 and 1.

In the present embodiment, the target color is set as one dot in the CIE L*C*h color space. That is, the color correction vector directed toward the target color in the CIE L*C*h color space is calculated as the color correction quantity.

The selection image storage unit 403 stores data of a selection image representing an external appearance of each image data, which is obtained by executing color correction on the pixel belonging to the color range according to the color correction quantity which the correction quantity calculating unit 402 has calculated on each of a plurality of target colors associated with the color range. In the MFP 100 illustrated in FIG. 4, the selection image is generated by the image generating unit 407.

The image generating unit 407 generates a thumbnail image representing an external appearance of each image data, which is obtained by executing color correction on the pixel belonging to the color range according to the color correction quantity which the correction quantity calculating unit 402 has calculated on each of a plurality of target colors associated with the color range. Even though not particularly limited, in the present embodiment, the image generating unit 407 first generates a thumbnail image (hereinafter, referred to as "non-corrected thumbnail image") corresponding to original image data based on image data stored in the temporary image storage unit 406. Then, by applying color correction to the non-corrected thumbnail image, a thumbnail image (hereinafter, referred to as "corrected thumbnail image") corresponding to image data that has been subjected to correction is generated. That is, the correction quantity calculating unit 402 calculates a color correction quantity on each pixel, which the pixel extracting unit 401 has extracted as the pixel belonging to the previously designated color range, from data of the non-corrected thumbnail image, and the image generating unit 407 generates data of a corrected thumbnail image by executing color correction on data of the non-corrected thumbnail image according to the color correction quantity (thumbnail color correction quantity). The data of the non-corrected thumbnail image and the data of the corrected thumbnail image generated by the image generating unit 407 are input to the selection image storage unit 403 and are stored in the selection image storage unit 403 as data of the selection image. The thumbnail image can be generated by a known technique, and thus the redundant description thereof will not be repeated.

The correction quantity calculating unit 402 stores a plurality of target colors associated with the color range used by the pixel extracting unit 401 to extract the pixel, and calculates the color correction quantity on each of the plurality of target colors. For example, when three target colors are associated with one color range, the correction quantity calculating unit 402 calculates the color correction quantity corresponding to each of the target colors. Then, the image generating unit 407 generates data of the corrected thumbnail image corresponding to each of the three target colors.

The selection receiving unit 404 displays the selection images stored in the selection image storage unit 403 and receives selection of a color correction type by the user. The selection receiving unit 404 receives selection of a color correction type corresponding to a target color represented by each selection image. Even though not particularly limited, in the present embodiment, the selection receiving unit 404 causes the corrected thumbnail images and the non-corrected thumbnail image to be displayed on the touch screen 201 as the selection images, and receives selection of the color correction type by the user. In the example in which three target colors are associated with one color range, the selection receiving unit 404 causes four thumbnail images including the non-corrected thumbnail image and a selecting button for selecting any one of the three corrected thumbnail images to be displayed on the touch screen 201.

The operation recognizing unit 411 recognizes an operation on the operating panel 200 including the touch screen 201 (pressing of the operating key 203 and pressing of the touch screen 201). Even though not particularly limited, in the present embodiment, coordinates of a pressing position detected by a sensor for detecting a pressing position of the touch screen 201 are input to the operation recognizing unit 411. Then, the operation recognizing unit 411 recognizes the user's operation content based on coordinates of a screen element such as an operating button, which are stored in itself and the coordinates of the input pressing position. An operation of selecting the color correction type by the user is also recognized by the operation recognizing unit 411, and is input to the selection receiving unit 404.

The color correction executing unit 405 executes a color correction process corresponding to the color correction type (target color) received by the selection receiving unit 404 on image data of a correction object. Even though not particularly limited, in the present embodiment, the color correction executing unit 405 executes the color correction, on each pixel which the pixel extracting unit 401 has extracted as a pixel belonging to the previously designated color range from the image data stored in the temporary image storage unit 406, according to the color correction quantity which is the color correction quantity corresponding to the color correction type (target color) received by the selection receiving unit 404 and calculated by the correction quantity calculating unit 402. The color correction executing unit 405 executes color correction on the pixel, which belongs to a predetermined color range, extracted from the image data of the correction object, according to the correction quantity corresponding to the color correction type received by the selection receiving unit 404.

Figure 5:
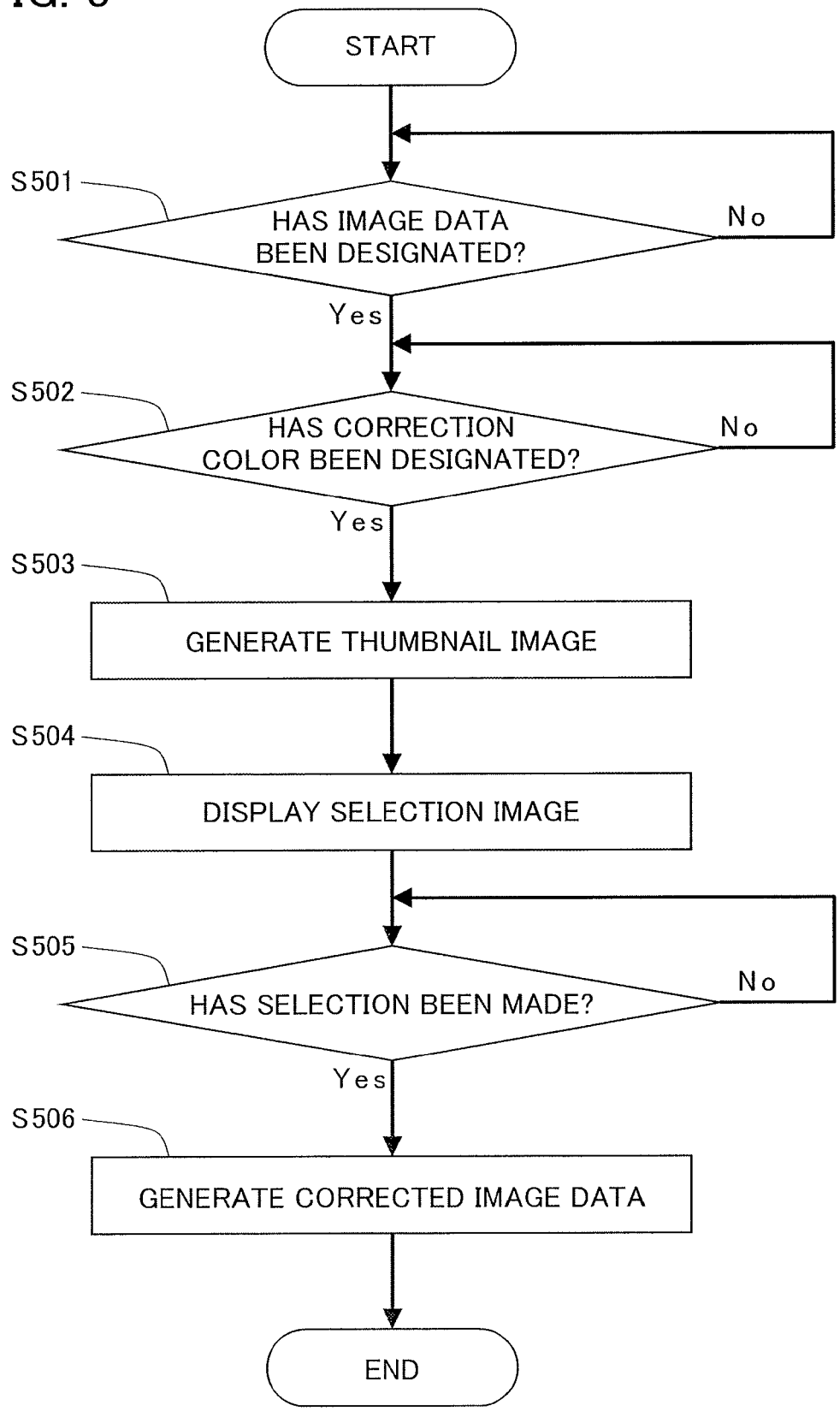
FIG. 5 is a flowchart illustrating an example of a color correction process executed by the MFP according to the first embodiment of the present disclosure.

FIG. 5 is a flowchart illustrating an example of a color correction process executed by the MFP 100. For example, the process starts using the fact that a color correction instruction is input by the user as a trigger. As described above, the color correction instruction is input to the MFP 100 when the user presses the "one touch image quality adjusting" button included in the "color/image quality" tab of the operation screen.

At this time, the MFP 100 (for example, the temporary image storage unit 406) displays a screen requesting designation of image data on the touch screen 201 and is on standby until image data is designated by the user (No in step S501). The user designates image data of a color correction object. The designation method is not particularly limited. For example, when image data stored in the image storage unit 412 is designated as the image data of the color correction object, a list of image data stored in the image storage unit 412 may be displayed on the touch screen 201. And user selects image data from the list. The selected image data is read from the image storage unit 412 and stored in the temporary image storage unit 406. The image data of the color correction object may be scanned by the image scanning unit 120. In this case, the user sets an original document of the color correction object on a document tray of the document feeder 110 and instructs the MFP 100 to start a scanning operation by pressing the start key or the like. The image data scanned by the image scanning unit 120 is stored in the temporary image storage unit 406. When the same color correction is applied, image data having a plurality of pages may be stored in the temporary image storage unit 406. However, this description is made in connection with an example in which image data has one page.

When designation of the image data is completed, the MFP 100 (for example, the pixel extracting unit 401) displays a screen requesting selection of a correction object color on the touch screen 201 and is on standby until the correction object color is selected by the user (Yes in step S501 and No in step S502). The user selects a color which becomes a correction object.

Figure 6:
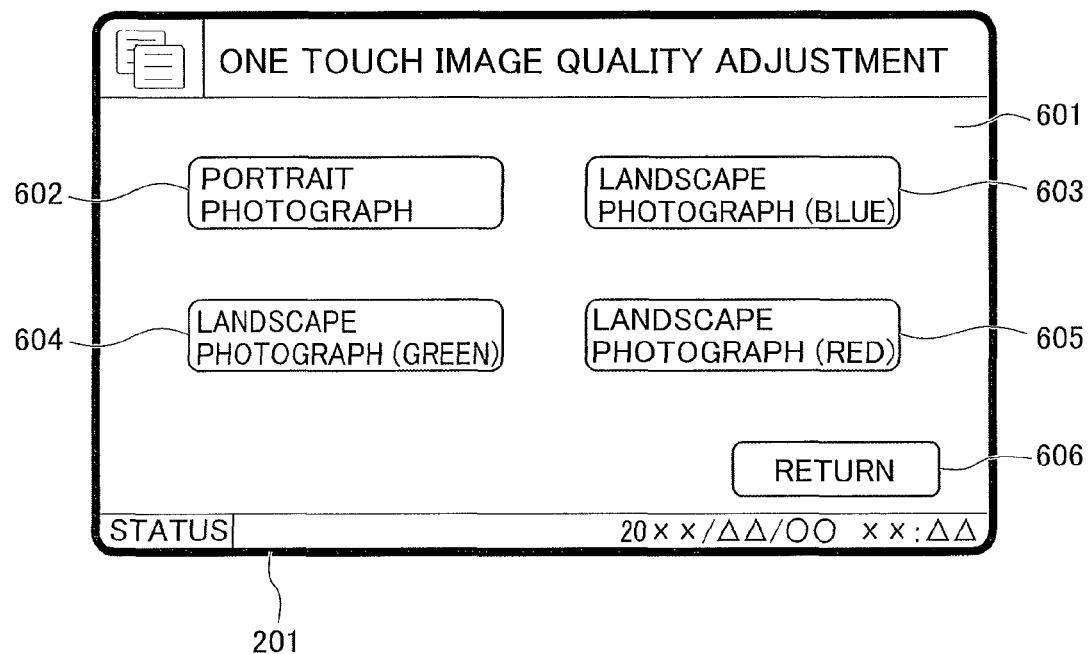
FIG. 6 is a diagram illustrating an example of an object color selection screen displayed by the MFP according to the first embodiment of the present disclosure.

FIG. 6 is a diagram illustrating an example of an object color selection screen displayed on the touch screen 201 at this time. In this example, an object color selection screen 601 includes selecting buttons 602 to 605 used for selecting the object color and a "return" button 606 for stopping a selecting operation and returning to an operation of designating image data. FIG. 6 illustrates an example in which a "portrait photograph" button 602 corresponding to a flesh color which is one of memory colors, a "landscape photograph (blue)" button 603 corresponding to a blue color which is one of memory colors, a "landscape photograph (green)" button 604 corresponding to a green color which is one of memory colors, and a "landscape photograph (red)" button 605 corresponding to a red color which is one of memory colors are arranged as examples of the selecting buttons. When the user selects one button from among the selecting buttons 602 to 605, the pixel extracting unit 401 sets a color range associated with the selected button (memory color) as a color range used for pixel extraction. The pixel extracting unit 401 sets the color range based on an instruction from any one of the selecting buttons 602 to 605 selectably displayed on the touch screen 201. In the present embodiment, the selecting buttons 602 to 605 selectably displayed on the object color selection screen 601 function as a color range designation unit. Further, in the present embodiment, the pixel extracting unit 401 functions as a color range setting unit.

The pixel extracting unit 401 sets a color range designated by the color range designating unit as a predetermined color range, and extracts an pixel belonging to the set predetermined color range.

For example, in FIG. 6, when the user selects the "landscape photograph (blue)" button 603, the pixel extracting unit 401 is set to a state for extracting a pixel of a color belonging to a color range of blue ($L^*$: 20 to 80, $C^*$: 5 to 55, Hue: 190 to 330°) associated with the selected button. The color ranges are registered to the pixel extracting unit 401 in association with the selecting buttons 602 to 605 in advance.

The pixel extracting unit 401 that has received designation of the correction object color instructs the image generating unit 407 to generate data of a non-corrected thumbnail image and data of a plurality of corrected thumbnail images (Yes in step S502 and step S503). The image generating unit 407 that has received the instruction first generates data of the non-corrected thumbnail image based on the image data stored in the temporary image storage unit 406 as described above. The image generating unit 407 that has generated the data of the non-corrected thumbnail image notifies the pixel extracting unit 401 of the fact. The pixel extracting unit 401 that has received the notice extracts a pixel having a color belonging to the color range designated through the object color selection screen 601 from data of the non-corrected thumbnail image generated by the image generating unit 407. The pixel extracting unit 401 inputs information (hereinafter, referred to as "color information") representing color of the extracted pixel and information (hereinafter, referred to as "positional information") representing the position of the pixel in the non-corrected thumbnail image to the correction quantity calculating unit 402 together with information (hereinafter, referred to as "color range identifier") representing the designated color range.

Figure 7:
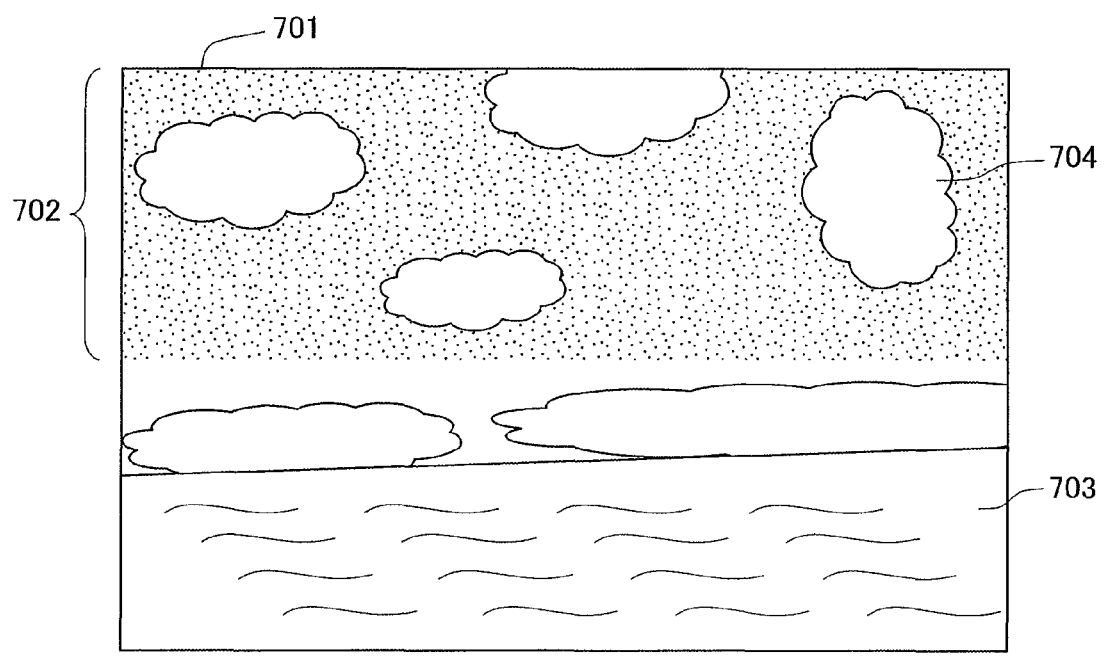
FIG. 7 is a schematic diagram illustrating an example of an image which is to be subjected to color correction executed by the MFP according to the first embodiment of the present disclosure.

FIG. 7 is a diagram illustrating an example of an image which is to be subjected to color correction. An image 701 illustrated in FIG. 7 includes a sea 703 that occupies about a third (⅓) of the image 701 in a lower portion and a sky that occupies two third (⅔) of the image 701 in an upper portion. A plurality of clouds 704 is present in the sky. A portion of the sky nearby an interface (horizontal line) with the sea 703 has a color close to white in combination with the presence of the cloud 704, and a portion of an area occupying about a half (½) of the image 701, from which the clouds 704 are excluded, is an area 702 having a thin blue color. The thin blue color is included in the color range of blue. The sea 703 is white with foam and has a slightly greenish color as a whole. The greenish color is not included in the color range of blue. When the pixel extracting unit 401, to which the color range of blue is set on the image 701, extracts pixels, pixels included in the area 702 are extracted.

The correction quantity calculating unit 402 that has received the input specifies a target color associated with the input color range identifier, and calculates a color correction quantity on the pixel, based on the target color and the input color information, for each target color using the above described technique. Even though not particularly limited, in the present embodiment, the color information which the pixel extracting unit 401 has input to the correction quantity calculating unit 402 is a color component in the sRGB color space, and the correction quantity calculating unit 402 is configured to transform the color component into a color component in the CIE $L^*C^*h$ color space.

The target colors are registered to the correction quantity calculating unit 402 in advance in association with the color range identifiers corresponding to the selecting buttons 602 to 605. For example, three points of ($L^*$, $a^*$, ($56, -18, -44$), ($L^*$, $a^*$, $b^*$)=($57, -1, -47$), ($L^*$, $a^*$, $b^*$)=($54, -28, -30$) in the CIE $L^*C^*h$ color space are registered as the target colors for the color range identifier representing the color range of blue. When the target color of ($L^*$, $a^*$, $b^*$)=($56, -18, -44$) is applied, an adjustment is made in a direction of vivid blue (hereinafter, referred to as "blue 1"). When the target color of ($L^*$, $a^*$, $b^*$)=($57, -1, -47$) is applied, an adjustment is made in a direction of deep blue including no green (hereinafter, referred to as "blue 2"). Further, when the target color of ($L^*$, $a^*$, $b^*$)=($54, -28, -30$) is applied, an adjustment is made in a direction of blue including green (so-called emerald green) (hereinafter, referred to as "blue 3").

Here, a description is briefly made in connection with the other selecting buttons in the object color selection screen 601. The "portrait photograph" button 602 is associated with a target color which is adjusted in a direction of a flesh color of a ruddy impression having red, a target color which is adjusted in a direction of a flesh color of a suntanned impression, and a target color which is adjusted in a direction of a fair flesh color. The "landscape photograph (green)" button 604 is associated with a target color which is adjusted in a direction of vivid green, a target color which is adjusted in a direction of yellow green, and a target color which is adjusted in a direction of slightly bluish green. Furthermore, the "landscape photograph (red)" button 605 is associated with a target color which is adjusted in a direction of vivid red, a target color which is adjusted in a direction of an orange color, and a target color which is adjusted in a direction of pink.

The correction quantity calculating unit 402 that has calculated the color correction quantity inputs the calculated color correction quantity to the image generating unit 407 together with the positional information and information (for example, identifiers of "blue 1", "blue 2", "blue 3", and the like) representing the target colors. The image generating unit 407 that has received the input corrects the color of the pixel of the non-corrected thumbnail image corresponding to the input positional information according to the input correction quantity, and thus generates the data of the corrected thumbnail images corresponding to the target colors. The correction quantity calculating unit 402 may apply the calculated color correction quantity to each input color information, and further input color information transformed into a color component in the sRGB color space to the image generating unit 407. In this case, the image generating unit 407 can generate the data of the corrected thumbnail images corresponding to the target colors by replacing the color of the pixel of the non-corrected thumbnail image corresponding to the input positional information with an input color.

The image generating unit 407 that has generated the data of the thumbnail images in the above descried manner inputs the generated data of the non-corrected thumbnail image and the data of the corrected thumbnail images to the selection image storage unit 403, and notifies the selection receiving unit 404 of the fact that the data has been generated. The selection receiving unit 404 that has received the notice causes the screen for receiving selection of the color correction type (target color) by the user to be displayed on the touch screen 201, and is on standby until the color correction type is selected by the user (step S504 and No in step S505). The screen includes the thumbnail images which are generated by the image generating unit 407 and then stored in the selection image storage unit 403.

Figure 8:
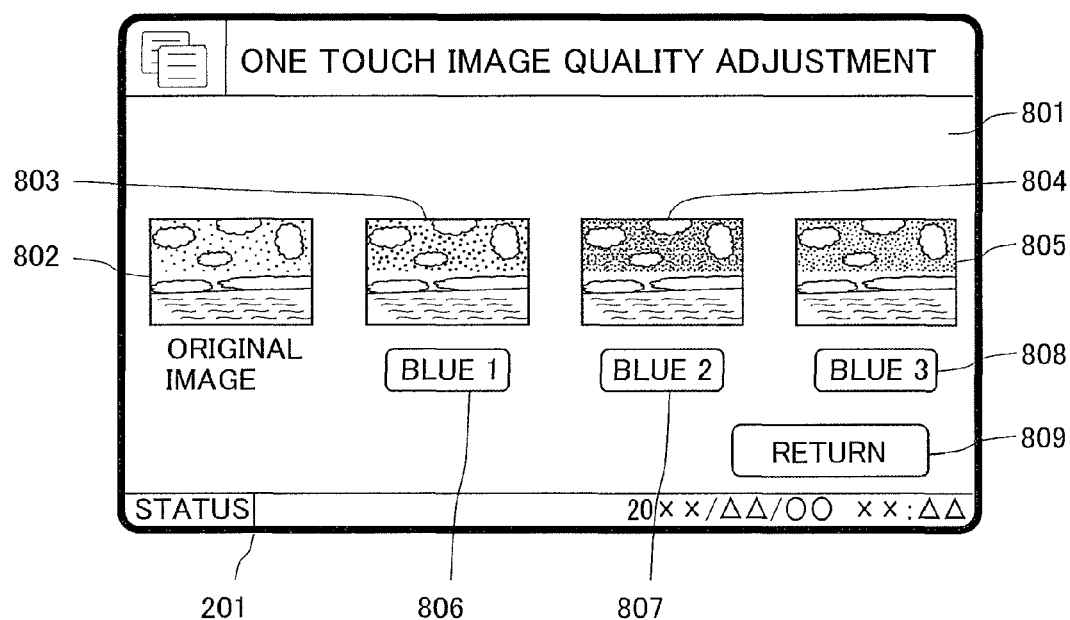
FIG. 8 is a diagram illustrating an example of a color correction type selection screen displayed by the MFP according to the first embodiment of the present disclosure.

FIG. 8 is a diagram illustrating an example of a color correction type selection screen displayed on the touch screen 201 at this time. In this example, a color correction type selection screen 801 includes a non-corrected thumbnail image 802 representing an external appearance of an original image and corrected thumbnail images 803 to 805 representing a corrected external appearance corresponding to the respective target colors as the selection images. In FIG. 8, the corrected thumbnail image 803 corresponds to "blue 1", the corrected thumbnail image 804 corresponds to "blue 2", and the corrected thumbnail image 805 corresponds to "blue 3". The color correction type selection screen 801 includes a "blue 1" button 806, a "blue 2" button 807, and a "blue 3" button 808 used for selecting the color correction type corresponding to the corrected thumbnail image, and a "return" button 809 used for stopping a selecting operation and returning to an operation of selecting the correction object color.

When the user selects any one of the "blue 1" button 806, the "blue 2" button 807, and the "blue 3" button 808 in the color correction type selection screen 801 illustrated in FIG. 8, information representing the selection information is input to the selection receiving unit 404 via the operation recognizing unit 411 (Yes in step S505). The selection receiving unit 404 that has received the input inputs information representing the selected color correction type (target color) to the color correction executing unit 405. For example, in FIG. 8, when the user selects the "blue 2" button 807, the selection receiving unit 404 inputs the identifier "blue 2" to the color correction executing unit 405.

The color correction executing unit 405 that has received the information representing the color correction type (target color) inputs the information to the correction quantity calculating unit 402, and notifies the pixel extracting unit 401 of the start of color correction. The pixel extracting unit 401 that has received the notice extracts the pixel having the color belonging to the previously designated color range from the image data stored in the temporary image storage unit 406. The pixel extracting unit 401 inputs the color information of the extracted pixel and the positional information of the extracted pixel in the image data to the correction quantity calculating unit 402. The correction quantity calculating unit 402 that has received the input specifies the target color based on the information representing the color correction type (target color) input from the color correction executing unit 405, and calculates the color correction quantity on the pixel based on the target color and the input color information using the above described technique.

The correction quantity calculating unit 402 that has calculated the color correction quantity inputs information of the calculated color correction quantity to the color correction executing unit 405 together with the positional information. The color correction executing unit 405 that has received the input executes color correction on the correction object image data by acquiring the image data stored in the temporary image storage unit 406 and correcting the color of the pixel corresponding to the input positional information according to the information of the input correction quantity. As described above, the correction quantity calculating unit 402 may apply the calculated color correction quantity to the input color information and further input color information transformed into a color component in the sRGB color space to the color correction executing unit 405. In this case, the color correction executing unit 405 may execute color correction by replacing the color of the pixel of the correction object image data corresponding to the input positional information with the input color. For example, when the user selects the "blue 2" button 807 on the image 701 illustrated in FIG. 7 in the color correction type selection screen 801 illustrated in FIG. 8, the color correction executing unit 405 executes color correction of making an adjustment in a direction of deep blue having no green on the area 702 of the correction object image data stored in the temporary image storage unit 406.

The color-corrected image data generated by the color correction executing unit 405 in the above described manner is output from the color correction executing unit 405 such that the color-corrected image data is printed by the image forming unit 140 or stored in the image storage unit 412.

As described above, the MFP 100 executes color correction only on the pixel belonging to the previously designated color range, that is, only on a pixel of a specific color. Thus, a change in an unintended color caused by application of color correction can be suppressed as much as possible. Even in this configuration, when a pixel belonging to a designated color range is present at a location to which it is not desired to apply color correction, a color of the pixel is also changed. However, since color correction is not necessarily applied to all pixels at a location to which it is not desired to apply color correction, a change in an unintended color is suppressed compared to the conventional technique.

Further, the user can select a desired color correction type (target color) based on thumbnail images obtained by executing a plurality of previously designated types of color corrections on correction object image data. Thus, the MFP 100 can very easily execute color correction.

Meanwhile, in the above described example, data of the thumbnail image is generated from correction object image data, and the thumbnail image is displayed on the color correction type selection screen as the selection image representing an external appearance of each image data that has been subjected to color correction. This configuration has an advantage capable of directly seeing a status in which color correction is applied to correction object image data. However, a processing time for generating the thumbnail image is necessary each time when color correction is performed. Further, in order to reproduce the memory color, it is necessary to reproduce a color close to a color remembered by human, that is, it is necessary to reproduce an image of a color present in human's memory. Thus, if a sample (a sample image) which can be compared to at least non color-corrected image data and color-corrected image data is present, the user can roughly determine whether or not color correction has been performed to conform with his/her image. In this regard, a description will be made below in connection with a configuration capable of implementing desired color correction at shorter time and with simpler configuration compared to the MFP 100.

Figure 9:
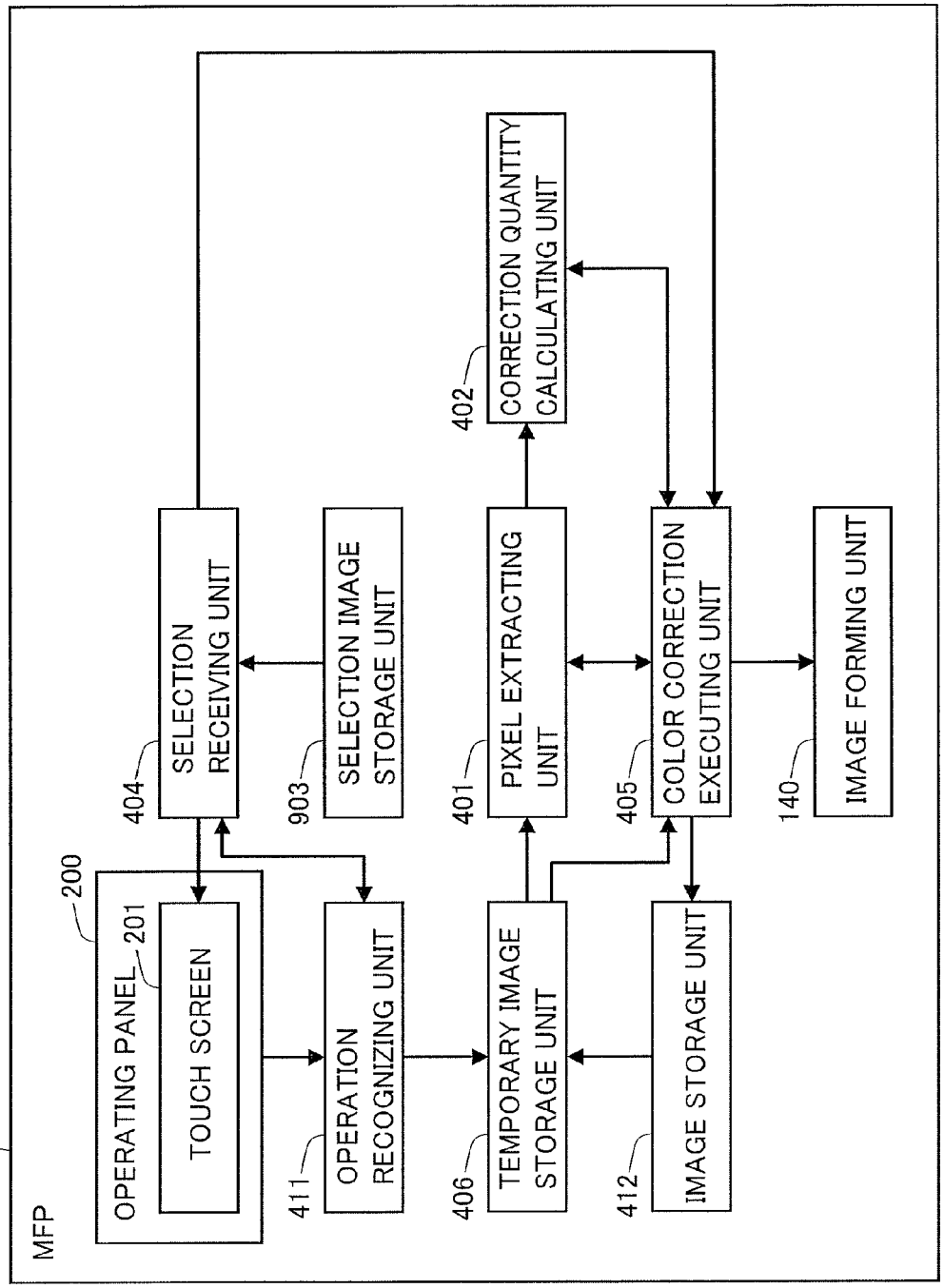
FIG. 9 is a functional block diagram illustrating another MFP according to the first embodiment of the present disclosure.

FIG. 9 is a functional block diagram illustrating another MFP according to the present embodiment. As illustrated in FIG. 9, an MFP 900 includes a pixel extracting unit 401, a correction quantity calculating unit 402, a selection image storage unit 903, a selection receiving unit 404, a color correction executing unit 405, and a temporary image storage unit 406. That is, the MFP 900 does not include the image generating unit. In FIG. 9, components having the same operation and effect as in the MFP 100 illustrated in FIG. 4 are denoted by the same reference numerals. The difference with the MFP 100 will be described below in detail.

In the configuration illustrated in FIG. 9, the selection image storage unit 903 stores a selection image, similarly to the selection image storage unit 403 illustrated in FIG. 4. However, in this example, the selection image storage unit 903 stores data of a sample image different from correction object image data as the selection image. The data of the sample image refers to each image data obtained by previously executing color correction on a pixel belonging to a color range designated to the pixel extracting unit 401 on previously designated specific image data according to color correction quantity which the correction quantity calculating unit 402 has calculated on each of a plurality of target colors associated with a corresponding color ranges. That is, the selection image storage unit 903 previously stores a specific image and images obtained by executing color correction on the specific image according to a plurality of target colors registered to the correction quantity calculating unit 402 through the pixel extracting unit 401, the correction quantity calculating unit 402, and the color correction executing unit 405.

For example, as described above, when three target colors are registered to one color range, the selection image storage unit 903 stores four selection images including a non-corrected image and three corrected images obtained by executing color correction on the non-corrected image according to the color correction quantities which the correction quantity calculating unit 402 has calculated on the three target colors. Each image is stored in association with a color range identifier representing a color range and information representing a target color (for example, identifiers such as "blue 1", "blue 2", and "blue 3"). Further, when a plurality of object colors are selectable as in the object color selection screen 601 illustrated in FIG. 6, the non-corrected image and the corrected images are stored in the selection image storage unit 903 in association with the color range identifier representing each object color and information representing the target color.

Preferably, the non-corrected image is an image corresponding to an object color. That is, when the object color is a flesh color ("portrait photograph"), an image in which a skin of a human face or the like occupies many areas in an image is desirable. When the object color is blue ("landscape photograph (blue)"), an image in which a blue sky or the like occupies many areas in an image is desirable. Further, when the object color is green ("landscape photograph (green)"), an image in which vegetation or the like occupies many areas in an image is desirable. When the object color is red ("landscape photograph (red)"), an image in which a sky at sunset occupies many areas in an image is desirable.

Figure 10:
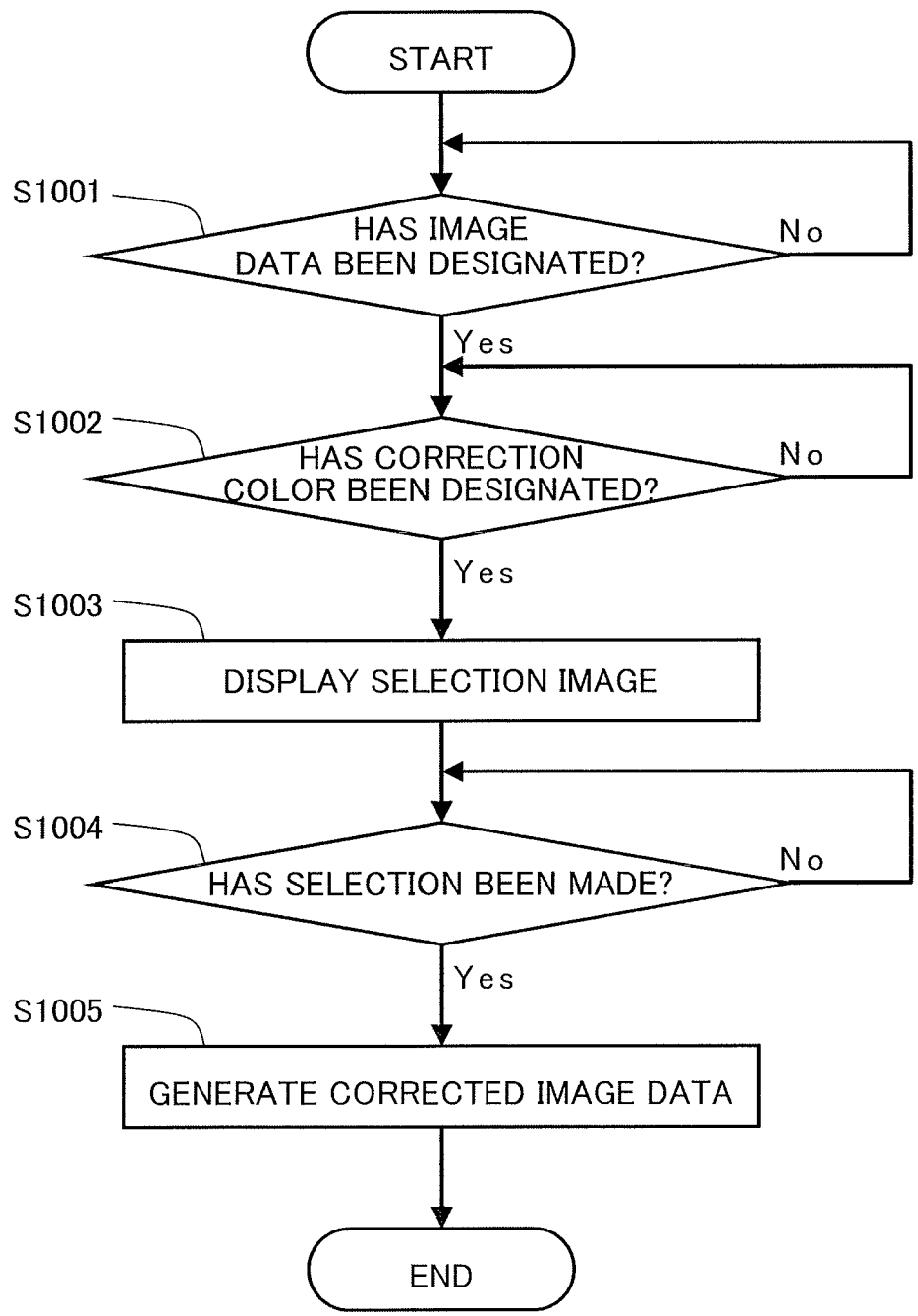
FIG. 10 is a flowchart illustrating an example of a color correction process executed by another MFP according to the first embodiment of the present disclosure.

FIG. 10 is a flowchart illustrating an example of a color correction process executed by the MFP 900. For example, the process starts using the fact that a color correction instruction is input by the user as a trigger. Similarly, the color correction instruction is input to the MFP 900 when the user presses the "one touch image quality adjusting" button included in the "color/image quality" tab of the operation screen.

At this time, the MFP 900 (for example, the temporary image storage unit 406) displays a screen requesting designation of image data on the touch screen 201 and is on standby until image data is designated by the user (No in step S1001). For example, the user designates image data which is a color correction object using the above described method.

When the image data has been designated, the MFP 900 (for example, the selection receiving unit 404) displays a screen requesting selection of a correction object color on the touch screen 201 and is on standby until the correction object color is selected by the user (Yes in step S1001 and No in S1002). The user selects a color that is a correction object. Here, similarly to the MFP 100, the object color selection screen 601 illustrated in FIG. 6 is displayed on the touch screen 201.

The selection receiving unit 404 that has received designation of the correction object color causes a screen for receiving selection of the color correction type (target color) by the user to be displayed on the touch screen 201, and is on standby until the color correction type is selected by the user (Yes in step S1002, step S1003, and No in step S1004). The screen includes selection images (the non-corrected image and the corrected image), corresponding to the selected object color, which are stored in the selection image storage unit 903.

Figure 11:
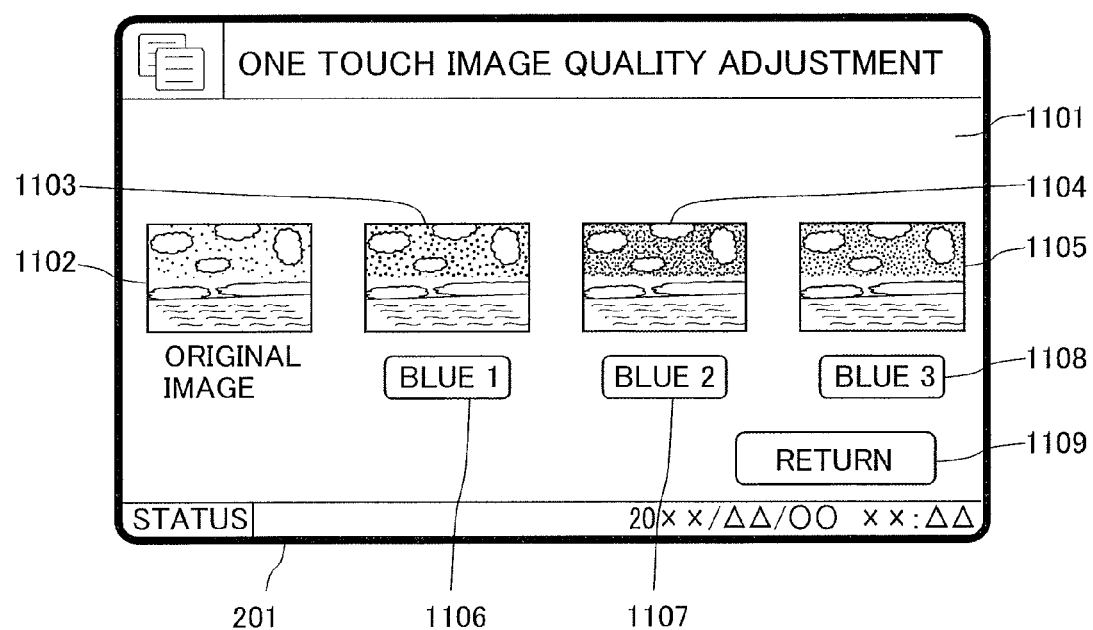
FIG. 11 is a diagram illustrating an example of an object color selection screen displayed by another MFP according to the first embodiment of the present disclosure.

FIG. 11 is a diagram illustrating an example of a color correction type selection screen displayed on the touch screen 201 at this time. In this example, a color correction type selection screen 1101 includes a non-corrected image 1102 representing a non-corrected external appearance, and corrected images 1103 to 1105 representing corrected external appearances corresponding to the target colors as the selection images. In FIG. 11, the corrected image 1103 corresponds to "blue 1", the corrected image 1104 corresponds to "blue 2", and the corrected image 1105 corresponds to "blue 3". The color correction type selection screen 1101 includes a "blue 1" button 1106, a "blue 2" button 1107, and a "blue 3" button 1108 used for selecting the color correction type corresponding to the corrected image, and a "return" button 1109 used for stopping a selecting operation and returning to an operation of selecting the correction object color. A function of the color correction type selection screen 1101 is similar to the function of the color correction type selection screen 801. However, the color correction type selection screen 1101 is different from the color correction type selection screen 801 in that the same selection images 1102 to 1105 are displayed, regardless of the image data designated in step S1001, when the same object color is selected.

When the user selects any one of the "blue 1" button 1106, the "blue 2" button 1107, and the "blue 3" button 1108 in the color correction type selection screen 1101 illustrated in FIG. 11, the selection information is input to the selection receiving unit 404 through the operation recognizing unit 411 (Yes in step S1004). The selection receiving unit 404 that has received the input inputs the information representing the selected color correction type (target color) to the color correction executing unit 405. The color correction executing unit 405 that has received the information representing the color correction type (target color) acquires the image data stored in the temporary image storage unit 406 using the same technique as in the MFP 100, and executes color correction on the acquired correction object image data.

As described above, even in the MFP 900, color correction is executed only on the pixel belonging to the previously designated color range, that is, only on the pixel of the specific color. Thus, a change in an unintended color caused by application of color correction can be suppressed as much as possible. Further, the user can select a desired color correction type based on selection images (sample images) obtained by executing a plurality of previously designated types of color corrections. Thus, color correction can be very easily executed. Since the selection image is the sample image that has been subjected to color correction in advance by the same algorithm, an implementation can be made with a simpler configuration than the MFP 100, and the processing time can be reduced.

The configuration of the MFP 100 can be further incorporated into the configuration of the MFP 900. In this case, the MFP can generate thumbnail image data from image data of a correction object as necessary and display the thumbnail image on the color correction type selection screen as the selection image representing an external appearance of each image data that has been subjected to color correction.

As described above, according to the present disclosure, a change in an unintended color caused by color correction can be suppressed as much as possible, and the user can easily execute desired color correction.

Second Embodiment

As described above, it is known that there is a regional difference in a color preferred by human. The present embodiment will be described in connection with a configuration in which the regional difference is reflected when the target color is selected using the selection image, and thus the user can easily select a desired target color.

FIG. 12 is a functional block diagram of an MFP according to the present embodiment. In FIG. 12, components having the same operation and effect as the components of the MFP 100 described in the first embodiment are denoted by the same reference numerals, and thus the redundant description thereof will not be repeated.

As illustrated in FIG. 12, an MFP 1200 of the present embodiment includes a transmitting unit 1201 and a receiving unit 1202 in addition to the configuration of the MFP 100. For example, the transmitting unit 1201 and the receiving unit 1202 can be implemented by hardware including a processor and a memory such as a RAM or a ROM and software which is stored in the memory and operates on a processor, similarly to the respective units of the MFP 100. The transmitting unit 1201 and the receiving unit 1202 are connected to the network 162 through the network adapter 161 and can communicate with an external device 1210 through the network 162. A configuration of the external device 1210 will be described later.

The transmitting unit 1201 transmits information representing the target color selected by the selection receiving unit 404, information (the color range identifier) representing the color range associated with the target color, and information (hereinafter, referred to as "regional information") representing a region where the MFP 1200 is installed to the external device 1210. For example, the information representing the target color selected by the selection receiving unit 404 refers to an identifier such as "blue 1", "blue 2", and "blue 3". For example, a regional code including a character string or the like which uniquely specifies each region may be used as the regional information. For example, the regional information is registered to the MFP 1200 when the MFP 1200 is sold or installed. Even though not particularly limited, the regional information may be registered to the selection receiving unit 404. The transmitting unit 1201 transmits information representing a selection frequency of a target color or a color correction type corresponding to each target color to the external device 1210.

The receiving unit 1202 receives information (hereinafter, referred to as "use frequency information") representing the selection frequency of the target color corresponding to the regional information registered to the MFP 1200 or the color correction type corresponding to each target color from the external device 1210. Even though not particularly limited, in the present embodiment, when the transmitting unit 1201 has transmitted the regional information to the external device 1210, the use frequency information corresponding to the regional information is transmitted from the external device 1210 to the MFP 1200. The receiving unit 1202 that has received the use frequency information inputs the use frequency information to the selection receiving unit 404. When selection of the target color by the user is received as described in the first embodiment, the selection receiving unit 404 causes the selection images to be displayed on the touch screen 201 according to an arrangement decided based on the use frequency information. Even though not particularly limited, in the present embodiment, the selection receiving unit 404 arranges a selection image of a target color having a high selection frequency on the left side in the color correction type selection screen 801 displayed when a subsequent target color is selected, based on the use frequency information.

Subsequently, the external device 1210 will be described. As illustrated in FIG. 12, the external device 1210 includes a network adapter 1211, a transmitting unit 1212, a receiving unit 1213, and a collecting unit 1214. For example, the transmitting unit 1212, the receiving unit 1213, and the collecting unit 1214 may be implemented by hardware including a processor and a memory such as a RAM or a ROM and software which is stored in the memory and operates on a processor. The transmitting unit 1212 and the receiving unit 1213 are connected to the network 162 through the network adapter 1211, and can communicate with the MFP 1200 through the network 162.

The receiving unit 1213 receives information representing the target color, the color range identifier associated with the target color, and the regional information, which are transmitted from the transmitting unit 1201 of the MFP 1200. The receiving unit 1213 inputs each received information to the collecting unit 1214.

The collecting unit 1214 collects each target color corresponding to each color range in association with information representing the selection frequency of the target color or the color correction type corresponding to each target color, for each region, based on the information received by the receiving unit 1213. Even though not particularly limited, in the present embodiment, the collecting unit 1214 stores a collection table for each color range identifier. The collection table stores the number of selection times of the target color which is included in the color range identifier or the color correction type corresponding to each target color in association with the regional information.

FIG. 13A is a diagram illustrating an example of a collection table stored in the collecting unit 1214. This example represents a collection table 1301 on a color range identifier representing a color range of blue. As illustrated in FIG. 13A, the collection table 1301 stores the number of selection times (the number of selection times of each region) of the target color or the color correction type corresponding to each target color for each regional code (here, "AS01", "AS02", "NA01", "SA01", "EP01", and "EP02") in association with the target color (herein, "blue 1", "blue 2", and "blue 3") included in the color range identifier representing the color range of blue.

For example, when the color range identifier representing the color range of blue, the identifier "blue 1", and the regional code "AS01" representing the Far East are input from the MFP 1200, a count value "188" corresponding to "blue 1" and "AS01", in the collection table 1301, corresponding to the input color range identifier, is counted up to "189". As a classification of the regional information, an arbitrary classification may be employed for each region including a plurality of countries or each country.

The collecting unit 1214 generates the use frequency information of each target color based on each count value included in the regional information to which the counted-up count value belongs in the collection table 1301. Even though not particularly limited, the use frequency information is configured with data in which information representing each target color is associated with information representing a magnitude relation between count values. The information representing the magnitude relation between the count values is configured with arbitrary information, which allows the magnitude relation to be recognizable, such as the count value itself, a descending order, and an ascending order.

The collecting unit 1214 inputs the generated use frequency information to the transmitting unit 1212 in association with the regional information ("AS01" in the above example) which is a generation object of the use frequency information and the color range identifier (the color range identifier representing the color range of blue in the above example). The transmitting unit 1212 that has received the input acquires destination information of the MFP 1200 from the receiving unit 1213 and transmits the input information to the MFP 1200. An operation of the MFP 1200 that has received the information is similar to the above described one.

As described above, according to the MFP 1200, when selection of the target color by the user is received, the selection receiving unit 404 can cause the selection images to be displayed on the touch screen 201 according to an arrangement based on the use frequency information acquired by the receiving unit 1202. For this reason, the selection receiving unit 404 can arrange the selection images in a selection frequency order of a target color, that is, in order of preference in a region where the MFP 1200 is installed. As a result, the user can easily select a preferred target color. For example, this configuration is useful particularly when the number of selectable target colors is large and it is necessary to display the selection images over a plurality of pages in the color correction type selection screen 801.

The above description has been made in connection with the configuration in which the receiving unit 1202 acquires the use frequency information from the external device 1210 using the fact that the transmitting unit 1201 of the MFP 1200 has transmitted information to the external device 1210 as a trigger. However, the receiving unit 1202 may receive the use frequency information from the external device 1210 at regular intervals (for example, once a day). The use frequency information received by the receiving unit 1202 is not limited to a single color range identifier, but the use frequency information of a plurality of color range identifiers belonging to the same regional information can be simultaneously acquired. In addition, the above description has been made in connection with the example in which the new configuration is added to the MFP 100. However, the configuration of the present embodiment may be applied to the MFP 900.

Meanwhile, the above description has been made in connection with the example in which the target color stored in the collection table 1301 of the external device 1210 is identical to the target color stored in the MFP. However, a target color which is not stored in the MFP may be included in the collection table of the external device 1210. In this case, when the MFP has a configuration that allows addition of a new target color, a target color can be added to the MFP ex-post facto based on the collection table of the external device 1210. Next, a description will be made in connection with a configuration of the MFP.

Figure 14:
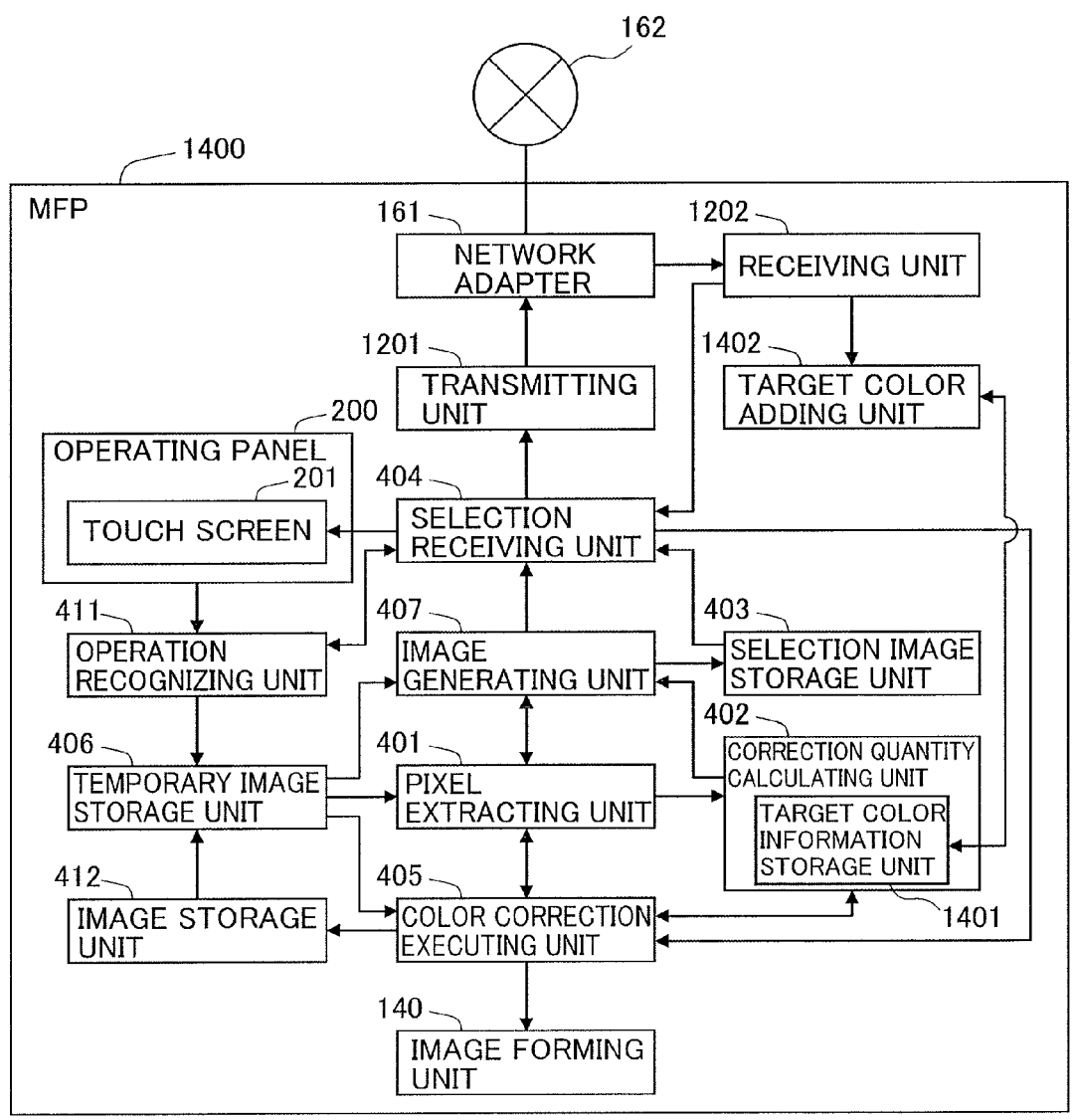
FIG. 14 is a functional block diagram of another MFP according to the second embodiment of the present disclosure.

FIG. 14 is a functional block diagram of the MFP. In FIG. 14, components having the same operation and effect as the components of the MFP 1200 are denoted by the same reference numerals, and thus the redundant description thereof will not be repeated. In FIG. 14, the external device 1210 connected to the network 162 is not illustrated.

As illustrated in FIG. 14, the MFP 1400 includes a target color information storage unit 1401 and a target color adding unit 1402 in addition to the configuration of the MFP 1200. The target color information storage unit 1401 is an area of the correction quantity calculating unit 402 that stores color information (here, color coordinates in the CIE L*C*h color space) of a target color, and stores color information of a target color corresponding to each selection image data stored in the selection image storage unit 403. In the present embodiment, the target color information storage unit 1401 is configured to allow the target color adding unit 1402 to add color information of a new target color thereto. For example, the target color adding unit 1402 can be implemented by hardware including a processor and a memory such as a RAM or a ROM and software which is stored in the memory and operates on a processor, similarly to the respective units of the MFP 1200.

In the MFP 1400, the receiving unit 1202 receives information representing a selection frequency of a target color, information representing each target color included in the information, and information representing a color range of an extraction object associated with each target color from the external device 1210, similarly to the MFP 1200. In this example, the information representing the target color includes an identifier representing the target color and color information.

FIG. 13B is a diagram illustrating an example of a collection table stored in the collecting unit 1214 of the external device 1210 in this example. FIG. 13B illustrates a collection table 1302 on a color range identifier representing a color range of blue. As illustrated in FIG. 13B, the collection table 1302 stores target colors "blue 1", "blue 2", "blue 3", "blue 4", and "blue 5" included in the color range identifier representing the color range of blue. Here, it is assumed that "blue 4" and "blue 5" are target colors unregistered to the MFP 1400. In the present embodiment, color coordinates (L*, a*, b*), in the CIE L*C*h color space, corresponding to an identifier representing each target color are stored in a target color table in the collecting unit 1214 in association with the identifier representing each target color. The collecting unit 1214 generates the use frequency information based on the color coordinates (color information) and information representing a target color including an identifier representing the target color. The transmitting unit 1212 transmits the use frequency information to the MFP 1400 in association with the regional information and the color range identifier.

The receiving unit 1202 of the MFP 1400 that has received the information inputs the received information to the selection receiving unit 404 and the target color adding unit 1402.

The target color adding unit 1402 compares the color information of the target color included in the input information representing the target color with color information of a target color previously stored in the target color information storage unit 1401. At this time, when the input information representing the target color does not include color information of a new target color which is not stored in the target color information storage unit 1401, the target color adding unit 1402 discards the input useless information. Meanwhile, when the input information representing the target color includes color information of a new target color which is not stored in the target color information storage unit 1401, the target color adding unit 1402 stores the color information of the new target color in the target color information storage unit 1401 in association with the color range identifier which the receiving unit 1202 has received together with the color information. In this example, since the new target colors "blue 4" and "blue 5" are included, the target color adding unit 1402 adds color information (color coordinates) of the new target color "blue 4" and color information of the new target color "blue 5" to the target color information storage unit 1401 in association with the color range identifier representing the color range of blue.

When the color information of the new target color is added to the target color information storage unit 1401 in the above described manner, a corrected thumbnail image having the new target color is generated and displayed on the color correction type selection screen 801 as the selection image as described in the first embodiment. The selection receiving unit 404 arranges the selection images of the target color having the high selection frequency on the color correction type selection screen 801 in order from the left side, based on the use frequency information.

As described above, according to the MFP 1400, when color information of a target color unregistered to its own device is included in a target color received from the external device 1210, the color information of the new target color may be automatically added and then selected by the user. In this configuration, a new target color can be added, ex-post facto, to an MFP connected to the external device 1210 by adding color information of the new target color to the external device 1210.

Here, the above description has been made in connection with the example in which a new element is added to the MFP 100, however, the configuration can be applied to the MFP 900. In this case, when the target color adding unit 1402 has added the new target color, the color correction executing unit 405 may generate a selection image corresponding to the new target color. For example, the selection image corresponding to the new target color may be generated such that the color correction executing unit 405 executes color correction on a non-corrected image, which is stored in the selection image storage unit 403 as one of selection images of a color range corresponding to the new target color, based on the new target color.

The above description has been made in connection with the example in which a new target color is added to the MFP 1400 by adding the new target color to the collection table 1302 of the external device 1210. However, the new target color may be added in the MFP connected to the external device 1210. In this case, the new target color added in the MFP is reflected in the collection table of the external device 1210 and then reflected in another MFP connected to the external device 1210.

Furthermore, the above description has been made in connection with the configuration in which a new target color belonging to a previously registered color range (color range identifier) is added. However, a new color range itself may be added. In this case, for example, the new color range is preferably set as a range whose color difference is about 30 in the CIE L*C*h color space. Further, target colors associated with the same color range are preferably apart from each other by a color difference of 3 or more in the CIE L*C*h color space.

Third Embodiment

The first and second embodiments have been described in connection with the configuration in which color correction is executed only on a pixel belonging to a specific color range in image data of a correction object. However, there may occur a situation in which not only color correction on a pixel belonging to a specific color range in image data of a correction object but also color correction on all pixels are executed. For example, it is a situation in which blue is changed to a specific target color, and a hue angle, a chroma, and the like are adjusted on all pixels. In this regard, the present embodiment will be described in connection with a configuration in which the user can easily execute desired color correction even under such a situation.

Figure 15:
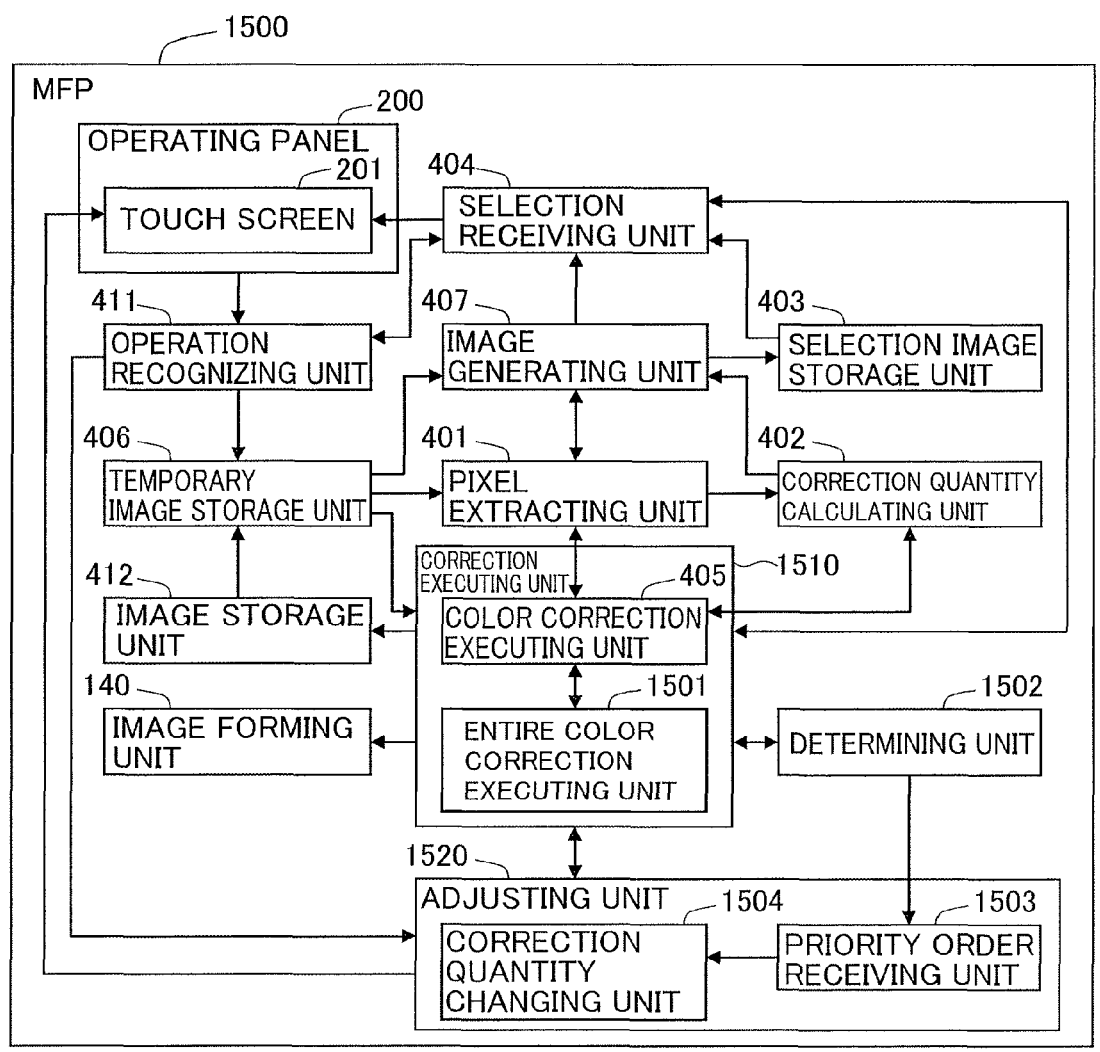
FIG. 15 is a functional block diagram of an MFP according to a third embodiment of the present disclosure.

FIG. 15 is a functional block diagram of an MFP 1500 according to the present embodiment. In FIG. 15, components having the same operation and effect as the components of the MFP 100 described in the first embodiment are denoted by the same reference numerals, and thus the redundant description thereof will not be repeated.

As illustrated in FIG. 15, the MFP 1500 according to the present embodiment includes an entire color correction executing unit 1501, a determining unit 1502, a priority order receiving unit 1503, and a correction quantity changing unit 1504 in addition to the configuration of the MFP 100. The entire color correction executing unit 1501, the determining unit 1502, the priority order receiving unit 1503, and the correction quantity changing unit 1504 can be implemented by hardware including a processor and a memory such as a RAM or a ROM and software which is stored in the memory and operates on a processor, similarly to the respective units of the MFP 100.

The entire color correction executing unit 1501 executes specific color correction (hereinafter, also referred to as "entire color correction") on all pixels of image data of a correction object. The content of correction performed on all pixels is set by the user through the operating panel 200. The content of the correction is not particularly limited if it relates to a color. For example, a hue angle, a chroma, and the like are included. In the present embodiment, the color correction executing unit 405 and the entire color correction executing unit 1501 configure the correction executing unit 1510, and execute an exchange of information with the selection receiving unit 404, the temporary image storage unit 406, the image storage unit 412, the image forming unit 140, the determining unit 1502, an adjusting unit 1520 which will be described later, and the like through the same paths.

When color correction by the color correction executing unit 405 and entire color correction by the entire color correction executing unit 1501 are executed together, the determining unit 1502 determines whether or not a pseudo contour has been generated in a peripheral edge of a correction object pixel range of the color correction executing unit 405. The peripheral edge refers to the vicinity of a boundary line of the correction object pixel range. Even though not particularly limited, in the present embodiment, the determining unit 1502 executes the determination by determining whether or not color gamuts of both color corrections overlap each other. For example, in the case in which a correction object color range of color correction by the color correction executing unit 405 is a "flesh color", when a correction object of the entire color correction executing unit 1501 is a blue component, the determining unit 1502 determines that the pseudo contour is not generated when both corrections are executed since the color gamuts do not overlap each other. However, when a correction object of the entire color correction executing unit 1501 is a red component, the determining unit 1502 determines that the pseudo contour is generated when both corrections are executed since the color gamuts overlap each other. Thus, in the present embodiment, the determining unit 1502 determines that the pseudo contour is generated when the pseudo contour is actually generated and when there is a possibility that the pseudo contour will be generated.

When the determining unit 1502 determines that the pseudo contour is not generated, the color correction executing unit 405 and the entire color correction executing unit 1501 execute color correction together. That is, in this case, the color correction executing unit 405 executes color correction on a pixel extracted by the pixel extracting unit 401, and the entire color correction executing unit 1501 executes entire color correction.

When the determining unit 1502 determines that the pseudo contour is generated, the priority order receiving unit 1503 receives a priority order between color correction which the color correction executing unit 405 executes on the pixel extracted by the pixel extracting unit 401 and entire color correction executed by the entire color correction executing unit 1501. In the present embodiment, the priority order receiving unit 1503 is configured to receive selection of the priority order which the user makes through the touch screen 201 of the operating panel 200.

The correction quantity changing unit 1504 changes a color correction quantity in color correction by the color correction executing unit 405 or a color correction quantity in color correction by the entire color correction executing unit 1501 according to the priority order received by the priority order receiving unit 1503. A method of changing the color correction quantity will be described below in detail. Even though not particularly limited, in the present embodiment, changing both correction quantities by the correction quantity changing unit 1504 may be executed by any of a method of changing using a predetermined value and a method of re-adjusting by the user. In the case of the method of re-adjusting by the user, the correction quantity changing unit 1504 is configured to receive a change in a color correction quantity by the user while causing an image representing an external appearance of image data, which is obtained by executing color correction by the color correction executing unit 405 and entire color correction by the entire color correction executing unit 1501 according to the changed color correction quantity, to be displayed on the touch screen 201.

In the present embodiment, the priority order receiving unit 1503 and the correction quantity changing unit 1504 configure the adjusting unit 1520 and execute an exchange of information with the touch screen 201, the operation recognizing unit 411, and the correction executing unit 1510 through the same paths.

Figure 16:
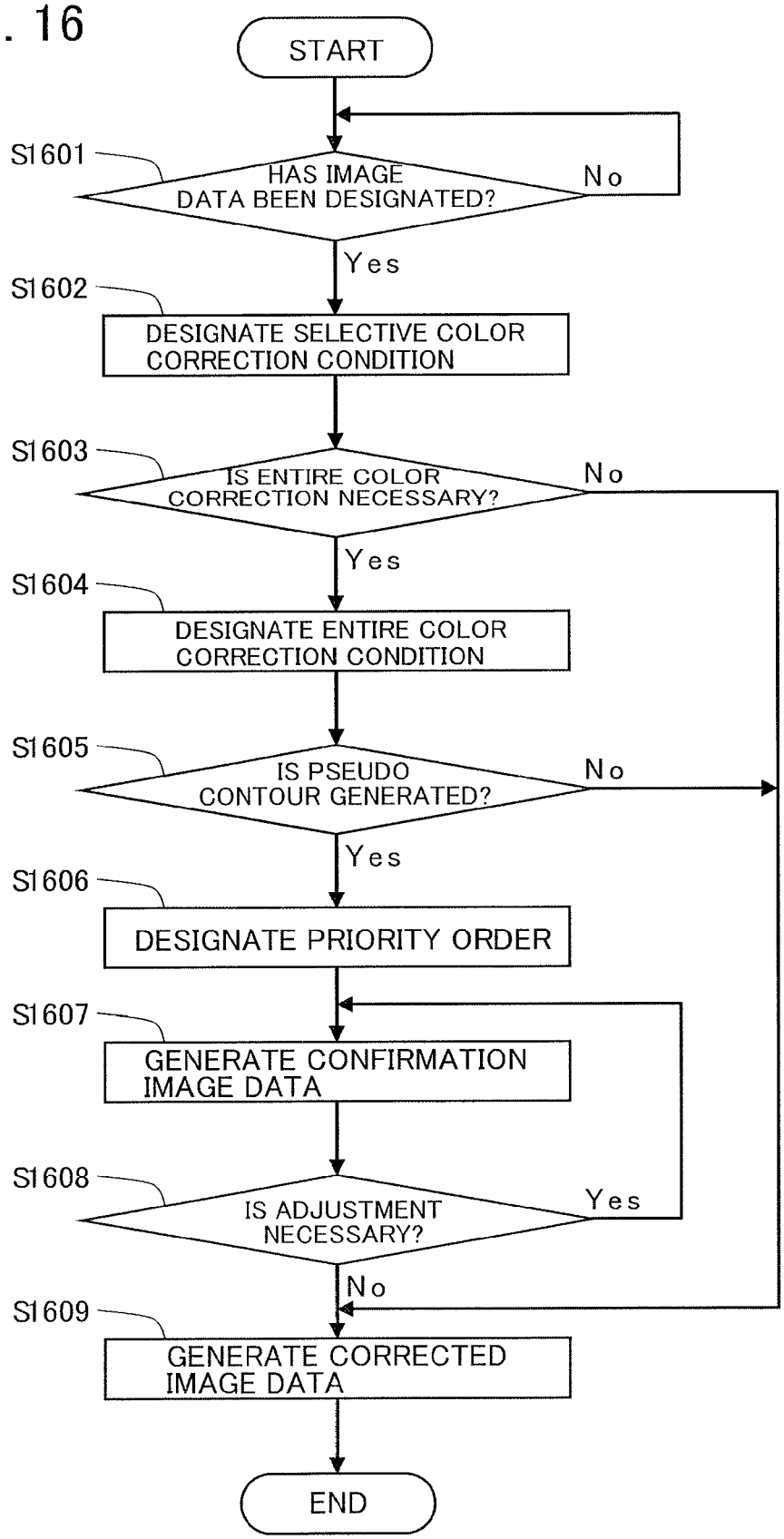
FIG. 16 is a flowchart illustrating an example of a color correction process executed by the MFP according to the third embodiment of the present disclosure.

FIG. 16 is a flowchart illustrating an example of a color correction process executed by the MFP 1500. For example, the process starts using the fact that a color correction instruction is input by the user as a trigger, similarly to the color correction process described in the first embodiment.

First, the MFP 1500 is on standby until image data is designated by the user (No in step S1601). A designation method is not particularly limited. For example, the technique described in the first embodiment may be used.

When the image data has been designated, the user sets a color correction condition of the color correction executing unit 405 (Yes in step S1601 and step S1602). For example, the color correction condition may be set using the process described in the first embodiment. Specifically, the user first selects a color which is a correction object of the color correction executing unit 405 in the object color selection screen 601 illustrated in FIG. 6. Next, the user selects a color correction type (target color) in the color correction type selection screen 801 illustrated in FIG. 8.

When the color correction condition has been set by the user, the color correction executing unit 405 notifies the entire color correction executing unit 1501 of the fact. The entire color correction executing unit 1501 that has received the notice queries the user about whether or not color correction needs to be performed on all pixels of correction object image data through the selection receiving unit 404 (step S1603).

Figure 17:
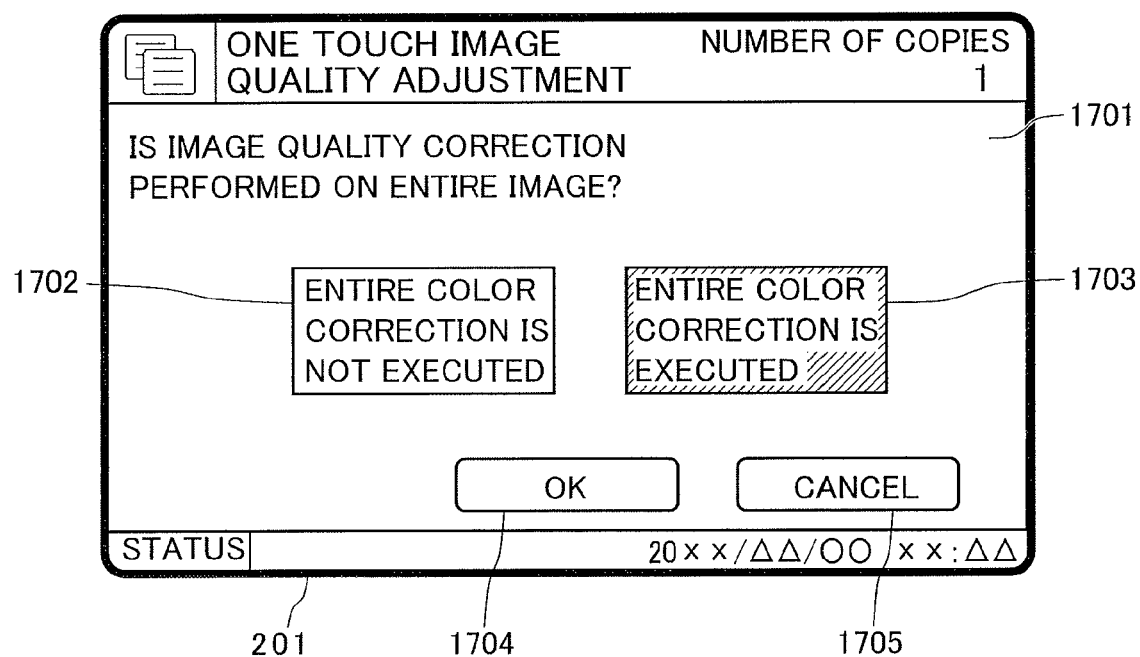
FIG. 17 is a diagram illustrating an example of an entire color correction need/no-need selection screen displayed by the MFP according to the third embodiment of the present disclosure.

FIG. 17 is a diagram illustrating an example of an entire color correction need/no-need selection screen which the entire color correction executing unit 1501 displays on the touch screen 201 through the selection receiving unit 404 when the query is given. In this example, an entire color correction need/no-need selection screen 1701 includes an "entire color correction is not executed" button 1702 selected when the entire color correction is unnecessary, an "entire color correction is executed" button 1703 selected when the entire color correction is necessary, an "OK" button 1704 selected for confirming the user's selection on each button, and a "cancel" button 1705 used for stopping a selection operation and returning to an immediately previous operation screen (herein, the color correction type selection screen 801). FIG. 17 illustrates a state in which the user has selected the "entire color correction is executed" button 1703.

In a state in which the "entire color correction is not executed" button 1702 is selected in the entire color correction need/no-need selection screen 1701, when the user selects the "OK" button 1704, the entire color correction executing unit 1501 notifies the color correction executing unit 405 of the fact. The color correction executing unit 405 that has received the notice executes color correction on correction object image data stored in the temporary image storage unit 406 according to the color correction content set to itself, similarly to the first embodiment (No in step S1603 and step S1609).

Further, in a state in which the "entire color correction is executed" button 1703 is selected, when the user selects the "OK" button 1704, the entire color correction executing unit 1501 causes a setting screen for setting the content of color correction set to itself to be displayed on the touch screen 201 and requests the user to set the content of color correction (Yes in step S1603 and step S1604). The setting screen may employ any configuration to the extent that the user can set the content of color correction by the entire color correction executing unit 1501.

When the user has set the color correction content through the setting screen, the entire color correction executing unit 1501 notifies the determining unit 1502 of the fact. The determining unit 1502 that has received the notice determines whether or not the pseudo contour is generated when color correction by the color correction executing unit 405 and entire color correction by the entire color correction executing unit 1501 are executed using the above described technique (step S1605).

When it is determined that the pseudo contour is not generated, the determining unit 1502 notifies the correction executing unit 1510 (the color correction executing unit 405 and the entire color correction executing unit 1501) of the fact. Each of the color correction executing unit 405 and the entire color correction executing unit 1501 that have received the notice executes color correction on the correction object image data stored in the temporary image storage unit 406 according to the color correction content set to itself (No in step S1605 and step S1609). Even though not particularly limited, the color correction executing unit 405 preferably executes color correction on image data obtained by executing color correction through the entire color correction executing unit 1501. That is, when the color correction quantity is calculated on the pixel which the pixel extracting unit 401 has extracted from the correction object image data stored in the temporary image storage unit 406 and then a color after correction is decided, the color correction executing unit 405 replaces a color of the corresponding pixel in the image data which has been subjected to entire color correction with the decided color. As a result, color correction of approximating a specific color of correction object image data to a target color can be compatible with color correction performed on all pixels.

Meanwhile, when it is determined that the pseudo contour is generated, the determining unit 1502 notifies the priority order receiving unit 1503 of the fact. The priority order receiving unit 1503 that has received the notice queries the user about a priority order between color correction by the color correction executing unit 405 and entire color correction by the entire color correction executing unit 1501 (Yes in step S1605 and step S1606).

Figure 18:
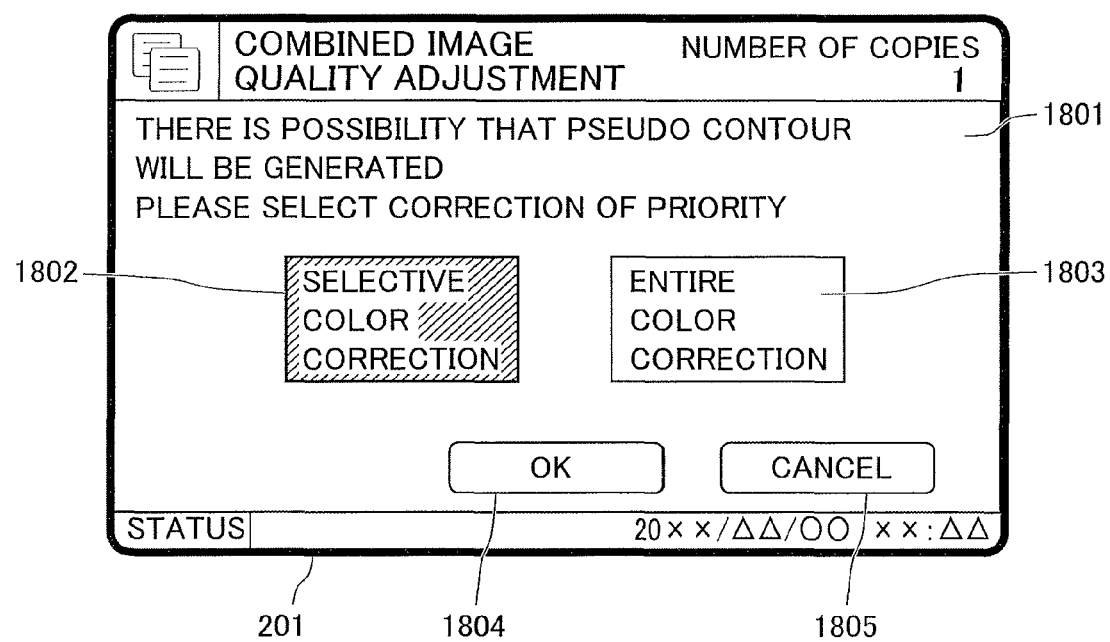
FIG. 18 is a diagram illustrating an example of a priority order selection screen displayed by the MFP according to the third embodiment of the present disclosure.

FIG. 18 is a diagram illustrating an example of a priority order selection screen which the priority order receiving unit 1503 displays on the touch screen 201 when the query is given. In this example, a priority order selection screen 1801 includes a "selective color correction" button 1802 selected when a priority is given to color correction by the color correction executing unit 405, an "entire color correction" button 1803 selected when a priority is given to entire color correction by the entire color correction executing unit 1501, an "OK" button 1804 selected for confirming the user's selection on each button, and a "cancel" button 1805 used for stopping a selection operation and returning to an immediately previous operation screen (here, the entire color correction need/no-need selection screen 1701). FIG. 18 illustrates a state in which the user has selected the "selective color correction" button 1802.

In a state in which the "selective color correction" button 1802 or the "entire color correction" button 1803 is selected in the priority order selection screen 1801, when the user selects the "OK" button 1804, the priority order receiving unit 1503 that has recognized the selection through the operation recognizing unit 411 inputs the selection to the correction quantity changing unit 1504. The correction quantity changing unit 1504 that has received the notice sets values of correction coefficients ks and ka in response to the user's selection. The correction coefficient ks is a constant by which the correction quantity on each pixel is equally multiplied in color correction by the color correction executing unit 405. Similarly, the correction coefficient ka is a constant by which the correction quantity on each pixel is equally multiplied in entire color correction by the entire color correction executing unit 1501.

When the user selects the "selective color correction" button 1802, the correction quantity changing unit 1504 sets the values of the correction coefficients ks and ka so that the correction coefficient ks can be larger than the correction coefficient ka (ks>ka). When the user selects the "entire color correction" button 1803, the correction quantity changing unit 1504 sets the values of the correction coefficients ks and ka so that the correction coefficient ks can be smaller than the correction coefficient ka (ks<ka). Even though not particularly limited, when the user selects the "selective color correction" button 1802, the correction quantity changing unit 1504 sets the values of the correction coefficients ks and ka to 1.3 and 0.7, respectively (ks=1.3 and ka=0.7). When the user selects the "entire color correction" button 1803, the correction quantity changing unit 1504 sets the values of the correction coefficients ks and ka to 0.7 and 1.3, respectively (ks=0.7 and ka=1.3). Then, the correction quantity changing unit 1504 inputs the set correction coefficients ks and ka to the correction executing unit 1510.

The correction executing unit 1510 (the color correction executing unit 405 and the entire color correction executing unit 1501) that has been input the correction coefficients ks and ka executes color correction on the correction object image data using the above described technique, and so generates confirmation image data (step S1607). When the confirmation image data is generated, the color correction executing unit 405 executes color correction using a value obtained by multiplying the correction quantity calculated by the correction quantity calculating unit 402 by the correction coefficient ks, and the entire color correction executing unit 1501 executes entire color correction using a value obtained by multiplying the set correction quantity by the correction coefficient ka. The confirmation image is displayed, as a preview, on a correction quantity confirmation adjustment screen through which the user adjusts the correction quantity of color correction by the color correction executing unit 405 and the correction quantity of entire color correction by the entire color correction executing unit 1501, which will be described later. For this reason, data of a thumbnail image, in which the number of pixels is reduced within a range that allows an external appearance after application of color correction to be recognizable, may be used as the confirmation image data. Even though not particularly limited, in the present embodiment, the correction executing unit 1510 generates the confirmation image data by reducing the number of pixels of the correction object image data stored in the temporary image storage unit 406 to change the size of the thumbnail image and then executing color correction.

The correction executing unit 1510 that has generated the confirmation image data inputs the confirmation image data to the correction quantity changing unit 1504. At this time, the correction quantity changing unit 1504 queries the user about whether or not the change in the correction quantity is appropriate (step S1608).

Figure 19:
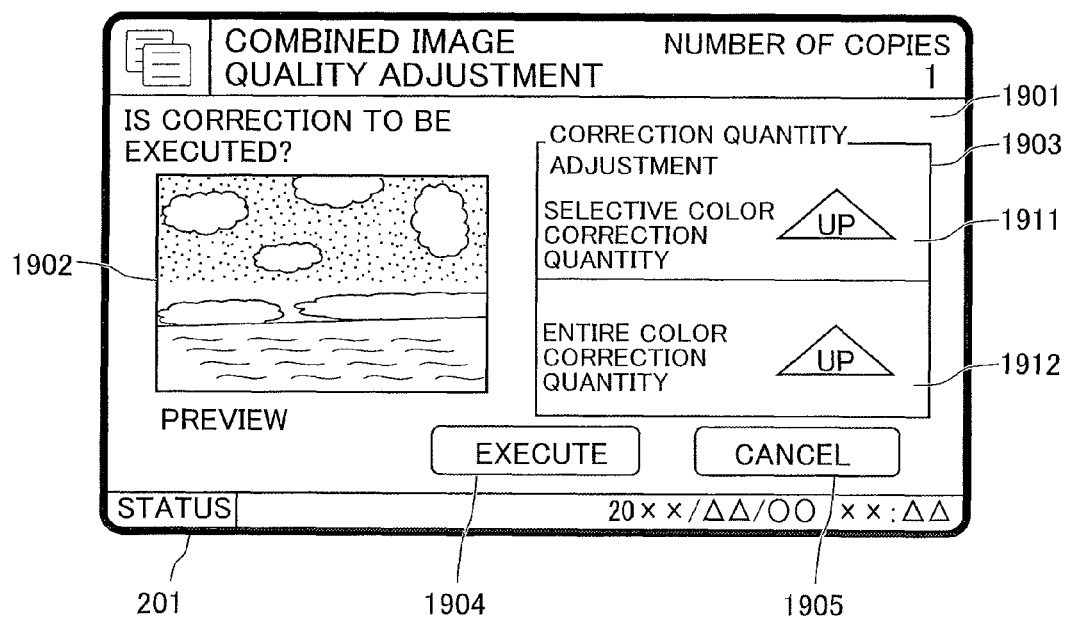
FIG. 19 is a diagram illustrating an example of correction quantity confirmation adjustment screen displayed by the MFP according to the third embodiment of the present disclosure.

FIG. 19 is a diagram illustrating an example of a correction quantity confirmation adjustment screen which the correction quantity changing unit 1504 displays on the touch screen 201 when the query is given. In this example, a correction quantity confirmation adjustment screen 1901 includes a preview display portion 1902 for displaying the confirmation image data, a correction quantity adjusting portion 1903 for designating a change quantity for changing the correction quantity, an "execution" button 1904 for instructing the correction executing unit 1510 to execute color correction, and a "cancel" button 1905 used for stopping a selection operation and returning to an immediately previous operation screen (here, the priority order selection screen 1801). The correction quantity adjusting portion 1903 includes a selective color correction quantity adjusting portion 1911 and an entire color correction quantity adjusting portion 1912. The selective color correction quantity adjusting portion 1911 is used for adjusting the correction quantity (the value of the correction coefficient ks) of color correction by the color correction executing unit 405. The entire color correction quantity adjusting portion 1912 is used for adjusting the correction quantity (the value of the correction coefficient ka) of entire color correction by the entire color correction executing unit 1501.

When the correction quantity changed according to the selection in the priority order selection screen 1801 is appropriate, the user preferably selects the "execution" button 1904 as is. At this time, the correction quantity changing unit 1504 instructs the correction executing unit 1510 to execute color correction (No in step S1608 and step S1609). In response to the instruction, the correction executing unit 1510 executes color correction on the correction object image data according to the correction coefficients ks and ka set at that point of time.

However, when the correction quantity changed according to the selection in the priority order selection screen 1801 is inappropriate, the user can adjust the correction quantity through the correction quantity adjusting portion 1903. For example, when it is desired to reinforce color correction by the color correction executing unit 405, it is desirable for the user to press an "UP" button of the selective color correction quantity adjusting portion 1911. At this time, the correction quantity changing unit 1504 adds a previously designated value (for example, 0.1) to the value of the correction coefficient ks, and subtracts the previously designated value from the value of the correction coefficient ka. When it is desired to reinforce color correction by the entire color correction executing unit 1501, it is desirable for the user to press an "UP" button of the entire color correction quantity adjusting portion 1912. At this time, the correction quantity changing unit 1504 adds a previously designated value (for example, 0.1) to the value of the correction coefficient ka, and subtracts the previously designated value from the value of the correction coefficient ks.

The correction quantity changing unit 1504, which has changed the values of the correction coefficients ks and ka by operating the selective color correction quantity adjusting portion 1911 or the entire color correction quantity adjusting portion 1912, inputs the changed correction coefficients ks and ka to the correction executing unit 1510. At this time, the correction executing unit 1510 re-generates the confirmation image data. A confirmation image based on the confirmation image data is displayed on the preview display portion 1902 of the correction quantity confirmation adjustment screen 1901 (Yes in step S1608, step S1607, and step S1608). When the adjusted correction quantity is appropriate, the user preferably selects the "execution" button 1904 (No in step S1608 and step S1609).

As described above, according to the MFP 1500, even when it is desired to execute color correction on all pixels in addition to color correction on a pixel of a specific color, color correction can be reliably executed. Since a priority order between color correction by the color correction executing unit 405 and entire color correction by the entire color correction executing unit 1501 can be set, the MFP 1500 can avoid generation of the pseudo contour and execute reliably color correction. Furthermore, the MFP 1500 can adjust the correction quantity of color correction by the color correction executing unit 405 and the correction quantity of entire color correction by the entire color correction executing unit 1501. In addition, since an image representing an external appearance of image data obtained by executing color correction is displayed during the adjusting process, the user can easily execute desired color correction.

The above description has been made in connection with the example in which the new configuration is added to the MFP 100. However, the configuration of the present embodiment may be applied to the MFPs 900, 1200, and 1400. In the present embodiment, an image representing an external appearance of image data obtained by executing color correction needs not be necessarily displayed in the process of adjusting the correction quantity of color correction by the color correction executing unit 405 and the correction quantity of color correction by the entire color correction executing unit 1501. Even in this configuration, since the correction quantity of color correction by the color correction executing unit 405 and the correction quantity of color correction by the entire color correction executing unit 1501 can be adjusted, generation of the pseudo contour can be avoided. Further, in the present embodiment, the correction quantity changing unit 1504 is not an essential component as well. Even in this configuration, since the correction quantity of color correction by the color correction executing unit 405 and the correction quantity of color correction by the entire color correction executing unit 1501 can be adjusted, generation of the pseudo contour can be avoided although it is fixed rate.

The above embodiments are not intended to limit a technical scope of the present disclosure, and various modification or applications can be made within the scope of the present disclosure besides the above described ones. For example, according to the above embodiments, an operation is made through the operation panel of the MFP. However, an operation on the MFP may be made through an information processing terminal communicably connected to the MFP. In this case, the function of the touch screen 201 of the operating panel 200 in the above embodiments is provided by a display unit such as a display and an input unit such as a keyboard which are included in the information processing terminal. Further, the components of the embodiments may be arbitrarily combined. In addition, the second embodiment and the third embodiment have been described based on the configuration premised on the MFP described in the first embodiment. However, the second embodiment and the third embodiment can be applied to any MFP with a function of changing a specific color to a target color even though the MFP has no function of displaying the selection image on the selection screen.

Furthermore, in the flowcharts illustrated in FIGS. 5, 10, and 16, an order between steps may be appropriately changed to the extent that an equivalent effect is obtained. For example, a non-corrected thumbnail image, which is generated in a thumbnail image generation step (step S503), may be generated directly after an image data designation step (step S501). Further, even when an image data designation step (step S501 and step S1001) and correction color designation step (step S502 and step S1002) are switched in order, the same effect is obtained. Furthermore, entire color correction condition designation step (step S1604) may be executed before selection color correction condition designation step (step S1602).

In addition, in the above embodiments, the present disclosure has been embodied as a digital MFP. However, the present disclosure is not limited to the digital MFP, and the present disclosure can be applied to any image processing apparatus such as a printer or a copying machine.

What is claimed is:

1. An image processing apparatus comprising:
   a display unit;
   an image storage unit that stores at least one image data;
   a pixel extracting unit that extracts a pixel belonging to a predetermined color range from predetermined image data stored in the image storage unit;
   a correction quantity calculating unit that calculates a color correction quantity on the pixel based on a color difference between a color of the pixel belonging to the predetermined color range extracted by the pixel extracting unit and each of at least one target color associated with the color range;
   a selection image storage unit that stores data of a selection image representing an external appearance of each image data obtained by executing color correction on the pixel belonging to the color range according to the color correction quantity, which is associated with the at least one target color, calculated by the correction quantity calculating unit;
   a selection receiving unit that causes the selection image to be displayed on the display unit based on the data of the selection image stored in the selection image storage unit, and receives selection of a color correction type corresponding to the target color;
   a color correction executing unit that executes color correction on the extracted pixel belonging to the predetermined color range in image data of a correction object according to a color correction quantity corresponding to the color correction type received by the selection receiving unit;

a color range designating unit that designates a color range; and an image generating unit, wherein the pixel extracting unit sets the color range designated by the color range designating unit as the predetermined color ranges, and extracts a pixel belonging to the set predetermined color range, wherein the pixel extracting unit extracts a pixel belonging to a predetermined color range from data of at least one non-corrected thumbnail image corresponding to the image data of the correction object, wherein the correction quantity calculating unit calculates a thumbnail color correction quantity on the pixel based on a color difference between a color of the pixel belonging to the predetermined color range extracted from the data of the non-corrected thumbnail image by the pixel extracting unit and each of at least one target color associated with the color range, and wherein the image generating unit generates at least one corrected thumbnail image by executing color correction on the data of the non-corrected thumbnail image according to the at least one calculated thumbnail color correction quantity.

2. The image processing apparatus according to claim 1, wherein the selection image storage unit stores the data of the at least one corrected thumbnail image generated by the image generating unit as the data of the selection image.

3. An image processing apparatus comprising:

a display unit;

an image storage unit that stores at least one image data;

a pixel extracting unit that extracts a pixel belonging to a predetermined color range from predetermined image data stored in the image storage unit;

a correction quantity calculating unit that calculates a color correction quantity on the pixel based on a color difference between a color of the pixel belonging to the predetermined color range extracted by the pixel extracting unit and each of at least one target color associated with the color range;

a selection image storage unit that stores data of a selection image representing an external appearance of each image data obtained by executing color correction on the pixel belonging to the color range according to the color correction quantity, which is associated with the at least one target color, calculated by the correction quantity calculating unit;

a selection receiving unit that causes the selection image to be displayed on the display unit based on the data of the selection image stored in the selection image storage unit, and receives selection of a color correction type corresponding to the target color; and a color correction executing unit that executes color correction on the extracted pixel belonging to the predetermined color range in image data of a correction object according to a color correction quantity corresponding to the color correction type received by the selection receiving unit, wherein the selection image storage unit stores data of a sample image, which is obtained by previously executing color correction on the pixel belonging to the color range in image data different from the image data of the correction object according to a color correction quantity which the correction quantity calculating unit has calculated on each of the at least one target color associated with the color range, as the data of the selection image.

4. An image processing comprising:

a display unit;

an image storage unit that stores at least one image data;

a pixel extracting unit that extracts a pixel belonging to a predetermined color range from predetermined image data stored in the image storage unit;

a correction quantity calculating unit that calculates a color correction quantity on the pixel based on a color difference between a color of the pixel belonging to the predetermined color range extracted by the pixel extracting unit and each of at least one target color associated with the color range;

a selection image storage unit that stores data of a selection image representing an external appearance of each image data obtained by executing color correction on the pixel belonging to the color range according to the color correction quantity, which is associated with the at least one target color, calculated by the correction quantity calculating unit;

a selection receiving unit that causes the selection image to be displayed on the display unit based on the data of the selection image stored in the selection image storage unit, and receives selection of a color correction type corresponding to the target color;

a color correction executing unit that executes color correction on the extracted pixel belonging to the predetermined color range in image data of a correction object according to a color correction quantity corresponding to the color correction type received by the selection receiving unit; and a receiving unit that receives information representing a selection frequency of a target color corresponding to a region where an own apparatus is installed or a color correction type corresponding to each target color from an external device including a collecting unit that collects each target colors corresponding to the color range in association with the information representing the selection frequency of the target color or the color correction type corresponding to each target color for each region, wherein the selection receiving unit decides an arrangement of the selection image to be displayed, based on the information representing the selection frequency of the target color or the color correction type corresponding to each target color, which is acquired by the receiving unit.

5. The image processing apparatus according to claim 4, further comprising a transmitting unit that transmits a color range, at least one target color corresponding to the color range, information representing a selection frequency of the target color or a color correction type corresponding to each target color, and information of a region where an own apparatus is set to the external device.

6. The image processing apparatus according to claim 5, further comprising:

a target color information storage unit that stores color information of a target color corresponding to selection image data stored in the selection image storage unit; and a target color adding unit that adds a new target color to the target color information storage unit, wherein the receiving unit receives the information representing the selection frequency of the target color or the color correction type corresponding to each target color, color information of each target color included in the information, and information representing a color range of an extraction object associated with each target color from the external device, and when color information of a new target color which is not stored in the target color information storage unit is included in the color information of the target color received by the receiving unit, the target color adding unit stores the color information of the new target color in the target color information storage unit in association with the information representing the color range of the extraction object.

7. An image processing apparatus comprising:

a display unit;

an image storage unit that stores at least one image data;

a pixel extracting unit that extracts a pixel belonging to a predetermined color range from predetermined image data stored in the image storage unit;

a correction quantity calculating unit that calculates a color correction quantity on the pixel based on a color difference between a color of the pixel belonging to the predetermined color range extracted by the pixel extracting unit and each of at least one target color associated with the color range;

a selection image storage unit that stores data of a selection image representing an external appearance of each image data obtained by executing color correction on the pixel belonging to the color range according to the color correction quantity, which is associated with the at least one target color, calculated by the correction quantity calculating unit;

a selection receiving unit that causes the selection image to be displayed on the display unit based on the data of the selection image stored in the selection image storage unit, and receives selection of a color correction type corresponding to the target color;

a color correction executing unit that executes color correction on the extracted pixel belonging to the predetermined color range in image data of a correction object according to a color correction quantity corresponding to the color correction type received by the selection receiving unit;

an entire color correction executing unit that executes specific color correction on all pixels of the image data of the correction object; and a determining unit that determines whether or not a pseudo contour is generated in a peripheral edge of a correction object pixel range of the color correction executing unit when color correction by the color correction executing unit and color correction by the entire color correction executing unit are executed together, wherein when the determining unit determines that the pseudo contour is not generated, the color correction executing unit executes color correction on a pixel extracted by the pixel extracting unit, and the entire color correction executing unit executes color correction by the entire color correction executing unit on all pixels.

8. The image processing apparatus according to claim 7, further comprising:

a priority order receiving unit that receives a priority order between color correction by the color correction executing unit performed on the pixel extracted by the pixel extracting unit and color correction by the entire color correction executing unit performed on all pixels when the determining unit determines that the pseudo contour is generated; and a correction quantity changing unit that changes a color correction quantity in color correction by the color correction executing unit and/or a color correction quantity in color correction by the entire color correction executing unit according to the priority order received by the priority order receiving unit.

9. The image processing apparatus according to claim 8, wherein the correction quantity changing unit causes an image representing an external appearance of image data, which is obtained by executing color correction by the color correction executing unit on the pixel extracted by the pixel extracting unit and color correction by the entire color correction executing unit on all pixels according to the changed color correction quantity, to be displayed, and receives a color correction quantity which is changed again.

* * * * *